United States Patent [19]
Tanabe et al.

[11] Patent Number: 6,055,238
[45] Date of Patent: Apr. 25, 2000

[54] PACKET TERMINAL AND PACKET COMMUNICATION NETWORK

[75] Inventors: Shiro Tanabe, Hidaka; Hidenori Inouchi, Tokyo, both of Japan

[73] Assignee: Hitachi, Ltd., Tokyo, Japan

[21] Appl. No.: 08/913,426

[22] PCT Filed: Mar. 17, 1995

[86] PCT No.: PCT/JP95/00475

§ 371 Date: Jan. 12, 1998

§ 102(e) Date: Jan. 12, 1998

[87] PCT Pub. No.: WO96/29799

PCT Pub. Date: Sep. 26, 1996

[51] Int. Cl.[7] .................................................. H04L 12/28
[52] U.S. Cl. .......................................... 370/398; 370/422
[58] Field of Search .................................. 370/230, 231, 370/235, 236, 357, 359, 389, 395, 419, 422, 463, 398; 376/423

[56] References Cited

U.S. PATENT DOCUMENTS

| | | | |
|---|---|---|---|
| 4,688,214 | 8/1987 | DeWitt et al. | 370/389 |
| 5,315,588 | 5/1994 | Kajiwara et al. | 370/395 |
| 5,473,598 | 12/1995 | Takatori et al. | 370/399 |
| 5,475,679 | 12/1995 | Munter | 370/395 |

FOREIGN PATENT DOCUMENTS

| | | |
|---|---|---|
| 138834 | 6/1988 | Japan . |
| 4-215357 | 6/1992 | Japan . |
| 5-130143 | 5/1993 | Japan . |

OTHER PUBLICATIONS

S. Tanabe, et al. "System Configuration of ATM Switching", *IEICE Technical Report SSE89–47–61*, vol. 89, No. 127, pp. 36–43, (1989).

*Primary Examiner*—Ricky Ngo
*Attorney, Agent, or Firm*—Antonelli, Terry, Stout & Kraus, LLP

[57] ABSTRACT

A communication network system comprising pairs of connection lines (3) composed of input lines and output lines, a switchboard (1) which relays a packet received from one of the input lines to one of the output lines specified by the header information contained in the packet, and terminals (2) connected to the switchboard through the connection lines (3). Each terminal (2) is provided with a communication controller (222 or 23a) which converts call control messages to be transmitted to the switchboard (1) and information messages to be transmitted to other terminals into packets of predetermined formats, sends them through the input lines, and converts packets received through the output lines and the switchboard (1) into messages. A master terminal (2a) which is one of the terminals is provided with a call processing program (224) for performing the call control of the switchboard (1). The switchboard (1) is provided with a line interface (12) for selectively relaying call controlling packets received through the input lines to the master terminal. The master terminal (2a) actuates the call processing program in response to call control messages converted from received packets by its communication controller (222 or 23a) and performs call control including the updating of control parameters required by the switchboard (1) for the status shift of each call and packet exchange.

19 Claims, 22 Drawing Sheets

PACKET TERMINAL AND PACKET COMMUNICATION NETWORK

TECHNICAL FIELD

The present invention relates to a packet exchange system, a packet communication network, and a packet terminal. In particular, the present invention relates to an ATM exchange system conducting communication by using fixed length packets (hereafter referred to as ATM cells) of asynchronous transfer mode (ATM), an ATM communication network, and a terminal having an exchange node control function.

BACKGROUND ART

As shown in FIG. 5 of "ATM exchange configuration scheme," Technical Report SSE89-53, The Institute of Electronics, Information and Communication Engineers, an ATM exchange forming an exchange node in an asynchronous transfer mode (ATM) network includes an ATM switch for transferring each of ATM cells inputted from a plurality of input ports to any one of a plurality of output ports according to header information of the cell, a line associated unit (a line interface) inserted between each of input/output ports of the ATM switch and an input/output line, a signal processor (communication controller) for converting ATM cells to a message or converting a message to ATM cells, and a call controller connected to the signal processor.

ATM cells for signalling received from each input line are inputted to the signal processor via the ATM switch, assembled into a message, and then transferred to the call controller.

The call controller includes a processor and a memory, and conducts an exchange process by using a stored programming control scheme. An exchange process program stored in the memory includes, for example, an origination analysis for determining whether origination of a call can be allowed, a digit analysis for translating a received address and determining a terminating destination, and a terminating line analysis to be conducted at the time of call termination.

In conventional ATM exchanges, all of the exchange process to be conducted since a call has occurred on an input/output line (a subscriber line or a trunk) until the call disappears is executed by a processor of the above described call controller incorporated in the exchange. Not only in the ATM exchanges but also in electronic exchanges using time division switches or space division switches, the exchange process is conducted in an equipment configuration similar to that described above.

However, the conventional equipment configuration has the following problems because the exchange process program is stored in the memory incorporated in the exchange.

(1) In the case where service contents in the exchange are to be changed (or added), it is necessary, no matter whether the scale of the change is large or small, to update an existing program file in a different place and download the updated file contents into the memory part of the above described exchange. Thus a lot of man power is required for amending the program.

(2) In the conventional call control processor of exchanges, an OS and a program language having special forms different from those of the OS and the program language typically used in user terminals are employed. For example, the CTRON is used as the OS, and the CHILL is used as the program language.

(3) Each exchange is controlled by a program incorporated in its call controller. Therefore, complicated control is needed for network-wide services extending over exchanges.

An object of the present invention is to provide such a packet exchange system and a packet communication network system that service contents in the exchange can be easily changed and added.

Another object of the present invention is to provide such a packet communication network system that network-wide services extending over a plurality of exchanges can be easily implemented.

Another object of the present invention is to provide a terminal having a function of communicating with another terminal and a function of controlling a packet exchange and capable of efficiently utilizing the data process capability.

DISCLOSURE OF INVENTION

In order to solve the above described problems, a terminal according to the present invention is characterized in that the terminal includes a processor, communication control means for sending/receiving packets to/from a line connected to the switchboard, and a call control program for conducting call control in the switchboard;

the communication control means converts a call control message and a user information message generated in said terminal respectively to signalling packets and user information packets, sends the signalling packets and the user information packets to the line, and converts signalling packets and user information packets received from the line via the switchboard respectively to a call control message and a user information message; and in response to a call control message supplied from said terminal or another terminal and converted from the received packets by the communication control means, the processor executes the call control program and performs call control including update of control parameters required for a packet exchange operation in the switchboard.

A packet exchange system according to the present invention is characterized in that the packet exchange system includes a plurality of pairs of connection lines for connection to terminals or another exchange, each pair having an input line and an output line, a switchboard for relaying packets received from an arbitrary input line to some output line determined by header information of the packets, and a master terminal connected to the switchboard via one of the connection lines;

the master terminal includes a processor, a call control program for conducting call control of the switchboard, an application program for processing an information message communicated between the master terminal and another terminal, and communication control means for converting a call control message to be sent to the switchboard and an information message to be sent to another terminal to packets of predetermined formats, sending the packets to the input line, and converting packets received from the output line via the switchboard to messages;

the switchboard has means for selectively relaying signalling packets received from each input line to the master terminal; and the master terminal executes the application program in response to an information message converted from received packets by the communication control means, executes the call control program in response to a call control message converted from received packets by the communication control means, and performs call control including a status shift of each call and update of control parameters required by the switchboard for a packet exchange operation.

Furthermore, a communication network system according to the present invention includes a plurality of pairs of connection lines each having an input line and an output line, a switchboard for relaying packets received from an arbitrary input line to some output line determined by header information of the packets, and a plurality of terminals coupled to the switchboard via the connection lines;

each of the terminals has communication control means for converting a call control message to be sent to the switchboard and an information message to be sent to another terminal to packets of predetermined formats, sending the packets to the input line, and converting packets received from the output line via the switchboard to messages;

a master terminal which is one of the plurality of terminals has call control means for conducting call control of the switchboard;

the switchboard has means for selectively relaying packets for signalling received from each input line to the master terminal; and in response to a call control message converted from the received packets by the communication control means, the master terminal actuates the call control means and performs call control including a status shift of each call and update of control parameters required by the switchboard for a packet exchange operation.

In the present invention, at least a part of connection lines of the above described switchboard may be trunk lines each connected to another switchboard instead of a terminal. Furthermore, the master terminal may be connected directly or indirectly to a plurality of switchboards to function as a call controller shared by the plurality of switchboards.

In a preferred embodiment of the present invention, the switchboard includes an ATM switchboard of self-routing type handling fixed length packets (ATM cells) of asynchronous transfer mode (ATM), and communication control means of each of terminals connected to the switchboard has a function of dividing a message to be sent into a plurality of fixed length blocks, converting each block to an ATM cell having a format standardized by the ITU-T, sending resultant ATM cells to the switchboard, and assembling ATM cells received from the switchboard into a message.

According to a packet exchange system and a communication network system of the present invention, packets (ATM cells) for signalling inputted to the switchboard are relayed to an output line to which the master terminal is connected, terminated by the master terminal, and processed by a call control function possessed by the master terminal. The call control function conducts, for example, origination analysis process, termination analysis process, connection process, and disconnection process for each call according to the contents of a received call control signal.

In the connection process of the switchboard, it is necessary in each line interface to which an originating terminal and a terminating terminal are connected to set header information for converting a header of an input packet to a header of an output packet in a label conversion table. In accordance with the present invention, setting header information in the label conversion table in the connection process and erasing the header information from the label conversion table in the disconnection process can be implemented by the master terminal sending signalling cells which specify the header information by the control parameters and the pertinent line interfaces of the switchboard terminating the signalling cells and rewriting the contents of respective label conversion tables.

If a call occurs in some terminal (originating terminal), the originating terminal sends a start signal containing information representing the address of a terminating terminal (dial number). The start signal is inputted to the switchboard as signalling ATM cells, and relayed to the master terminal. In this case, the master terminal itself may become the originating terminal.

The master terminal conducts originating process having determination of an output route number and a virtual path identifier (VPI), acceptance and control of a call, and hunting of the virtual channel identifier (VCI) as the contents according to the address of the terminating terminal, and actuates the terminating terminal. The terminating terminal conducts the termination process, and thereafter sends ATM cells of a confirmation signal to the switchboard.

The ATM cells of the confirmation signal are relayed to the master terminal by the switchboard. In response to reception of the confirmation signal, the master terminal sends a connection command containing the header information to the switchboard, and sends a confirmation signal to the originating terminal. As a result, a call (connection) is established between the originating terminal and the terminating terminal. In this case, the master terminal itself may become the terminating terminal.

The control operation heretofore described is the control operation in the case where the master terminal establishes a call between terminals, i.e., in the case where call control is conducted in an interface (UNI) between a user and a network (switchboard). If the switchboard accommodates another exchange besides the terminals, however, then a call control program for the UNI and a call control program for the network-network interface (NNI) are prepared in the master controller, and either the call control program of the UNI or the call control program of the NNI is selectively started according to the format of the signalling ATM cells relayed by the switchboard.

After the call establishment has been completed, ATM cells containing the user information are communicated without passing through the master terminal. If an operation for disconnecting the connection is conducted in either of terminals, then ATM cells for signalling representing a disconnection signal are relayed by the switchboard, and the master terminal executes the disconnection process of the pertinent call. As a result, unnecessary parameters are erased from the label conversion table in the line interfaces of the switchboard, and a disconnection signal is sent to the other terminal. The call control operation is thus finished.

BEST MODE FOR CARRYING OUT THE INVENTION

A first embodiment of a packet communication network using a master terminal according to the present invention will now be described by referring to FIGS. 1 through 12.

Figure 1:
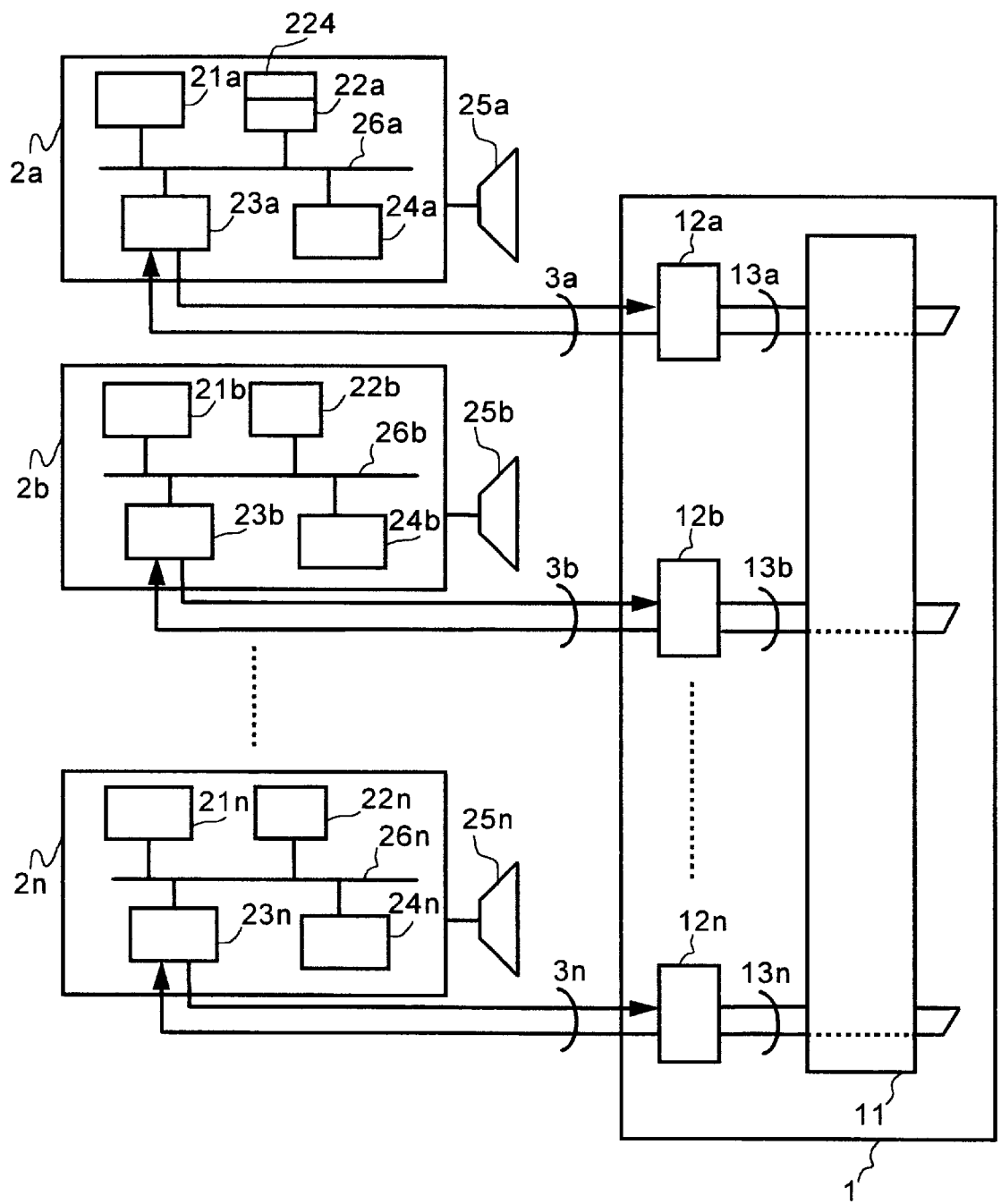
FIG. 1 is a configuration diagram showing a first embodiment of a packet communication network including an ATM switch having a user-network interface (UNI) function according to the present invention.

With reference to FIG. 1, a packet communication network includes an ATM switching equipment 1 and a plurality of terminals 2 connected to the ATM switch 1 respectively via ATM lines 3 (3a through 3n).

The ATM switchboard 1 includes a plurality of ATM line associated units (line interfaces) 12 (12a through 12n) for accommodating the ATM lines 3, an ATM switch 11, internal ATM lines (input/output ports) 13 (13a through 13n) for connecting the ATM line associated units 12 to the ATM switch 11. The ATM switch 11 includes a self routing switch for switching an ATM cell inputted from each input port to one of output ports on the basis of routing information contained in a header part of the ATM cell.

Each terminal 2 includes a processor 21, a memory 22, an ATM adapter 23 for converting a transmission message to ATM cells, transmitting the ATM cells to an ATM line 3, and assembling ATM cells received from an ATM line 3 into a message, an I/O driver 24 for connection to an input/output device such as a keyboard or a display, and a bus 26 for interconnecting these components.

In accordance with the present invention, a specific one out of a plurality of terminals each having an ATM cell transmitting and receiving function and mutually communicating via the ATM switching equipment 1, i.e., a terminal 2a (hereafter referred to as master terminal) in this example is equipped with a call process function (call process program) 224 described later in a memory 22a. In addition to the function of a data process terminal similar to that of other terminals, the master terminal performs a function as a call controller of the ATM switching equipment 1.

Figure 2:
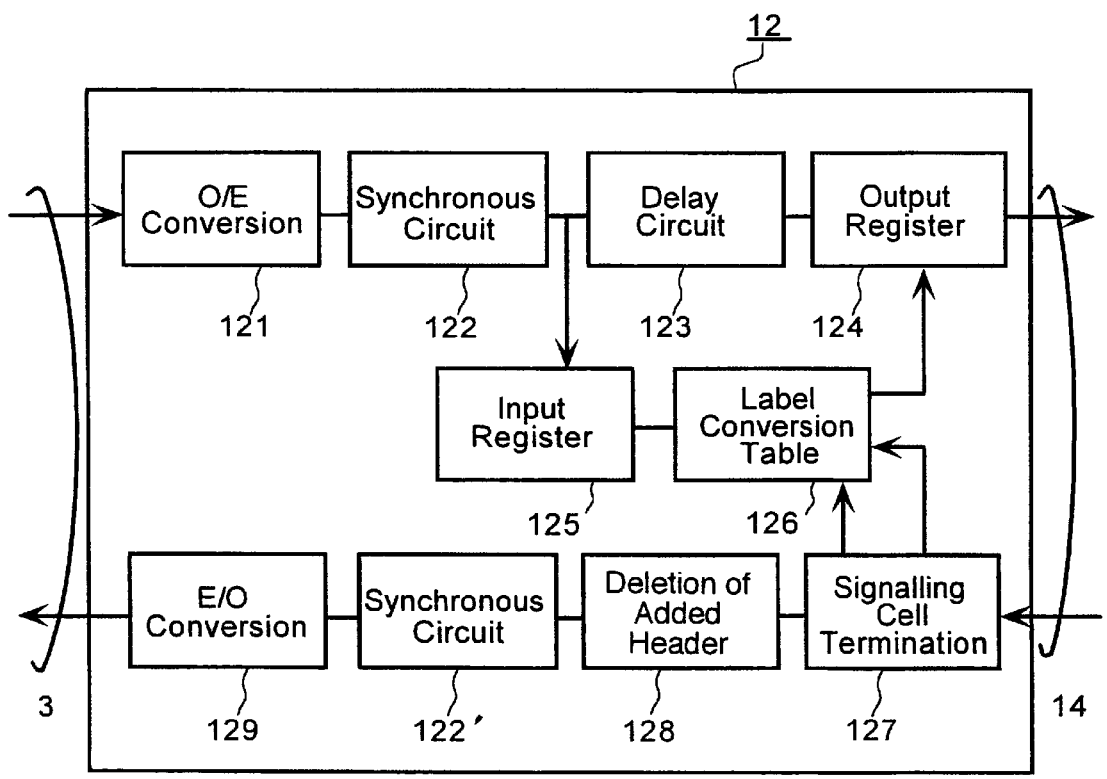
FIG. 2 is a diagram showing an example of the configuration of a line associated unit 12 of the ATM switch.

FIG. 2 shows the configuration of the ATM line associated unit 12 of the ATM switching equipment 1.

Main functions of the ATM line associated unit 12 are a function of conversion between an optical signal and an electric signal, an ATM cell synchronizing function, and a label conversion function. The ATM line associated unit 12 includes an input line interface circuit provided in an up direction transmission path between an input line of the ATM line 3 and an input port of the ATM switch 11, and an output line interface circuit provided in a down direction transmission path between an output port of the ATM switch 11 and an output line of the ATM line 3.

The input line interface circuit includes an O/E conversion unit 121 for converting an optical signal (ATM cell signal) received from an input line to an electric signal, a synchronous circuit 122 for attaining cell synchronization on the received signal, a delay circuit 123, an output register 124, an input register 125 for extracting a header part of each input cell, and a label conversion table 126.

Figure 3:
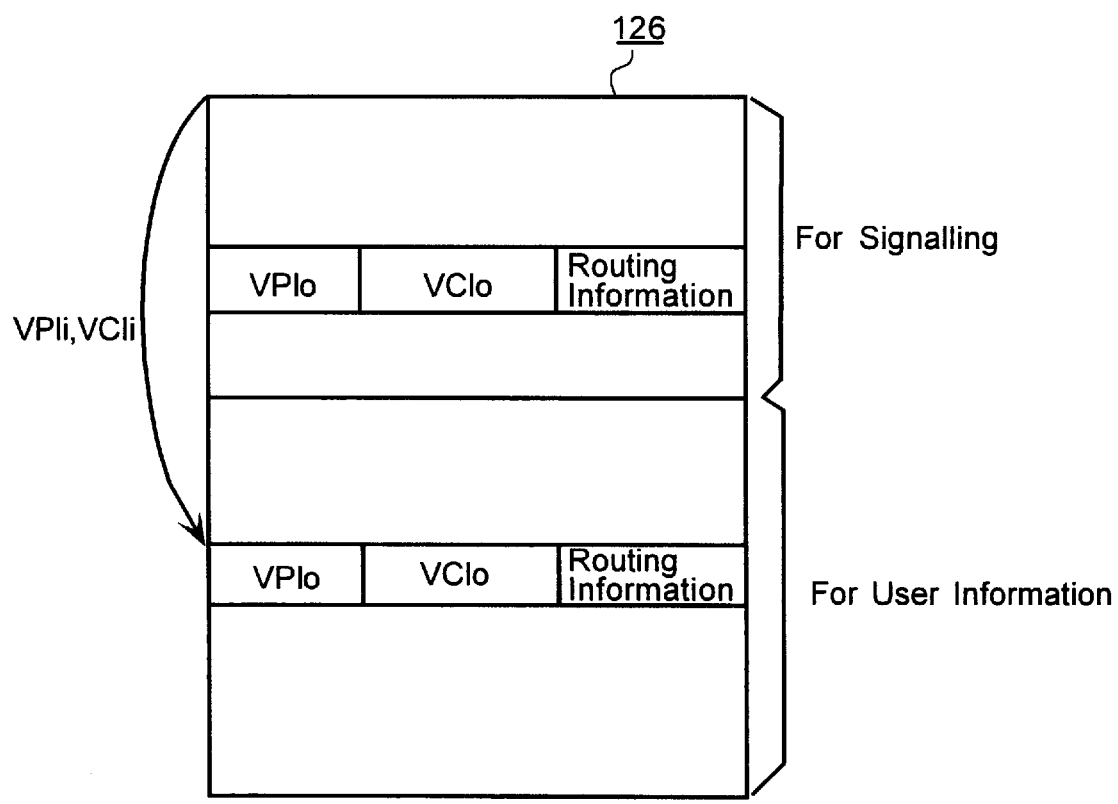
FIG. 3 is a diagram showing a configuration of a label conversion table 126.

As shown in FIG. 3, the label conversion table 126 stores a header information record in an address location determined by a connection identifier (a combination of VPIi and VCIi) contained in the header part of an input cell. The header information record includes a connection identifier (VPIo and VCIo) which becomes effective on the line of the output side, and routing information for specifying an output port of the ATM switch 11.

A storage area of each label conversion table 126 includes an area for signalling which stores header information associated with a connection identifier of a cell for signalling, and an area for user information which stores header information associated with a connection identifier of a cell for user information.

In the input line interface circuit, connection identifiers (VPIi, VCIi) contained in the header of each input cell are extracted, and header information for output is read out from the label conversion table by using the connection identifiers as the address. An input cell outputted from the delay circuit 123 is inputted to the output register 124. The contents of the header part are rewritten to become the header information for output (VPIo, VCIo, and routing information).

Each terminal is notified beforehand of connection identifiers (VPIi and VCIi) to be attached to cells for signalling. When a signalling cell is inputted from a terminal, specific header information is read out and the header conversion of the input cell is conducted in each input line interface circuit. The specific header information contains connection identifiers for outputting (VPIo and VCIo) peculiar to each terminal and routing information indicating the output line 13a accommodating the master terminal.

In a signalling area of the label conversion table 126 of the line associated unit 12a to which the master terminal 2a is connected, header information containing connection identifiers for outputting (VPIo and VCIo) and routing information indicating an output line accommodating the destination terminal is preset in association with the input connection identifiers (VPIi and VCIi) peculiar to each terminal, in order to conduct header conversion of signalling cells generated toward ordinary terminals 2a through 2n or line associated units 12a through 12n by the master terminal 2a functioning as the call controller.

The connection identifiers for inputting and header information for outputting to be attached to a user information cell by each terminal are determined by the master terminal in the course of call establishment between terminals. And an ATM line associated unit 12 relating to each call (connection) is notified of them by using signalling cells for setting control parameters generated by the mask terminal.

The output line interface circuit includes a signalling cell termination circuit 127 for terminating the above described specific signalling cells for setting the signalling parameters received from the output port of the ATM switch 11 and updating the contents of the label conversion table 126, an added header deletion circuit 128 for removing routing information from the header part of the ATM cells to be transferred to the output line (ATM line) 3, a synchronous circuit 122' for attaining cell synchronization according to the clock on the output line, and an O/E conversion unit 129 for converting an electric cell signal to an optical signal. By checking a part of the connection identifier, such as the highest order bit, of a cell received from the ATM switch 11, the signalling cell termination circuit 127 judges whether the cell is a cell to be transferred to the output line 3 or a signalling cell to be terminated by itself.

Figure 4:
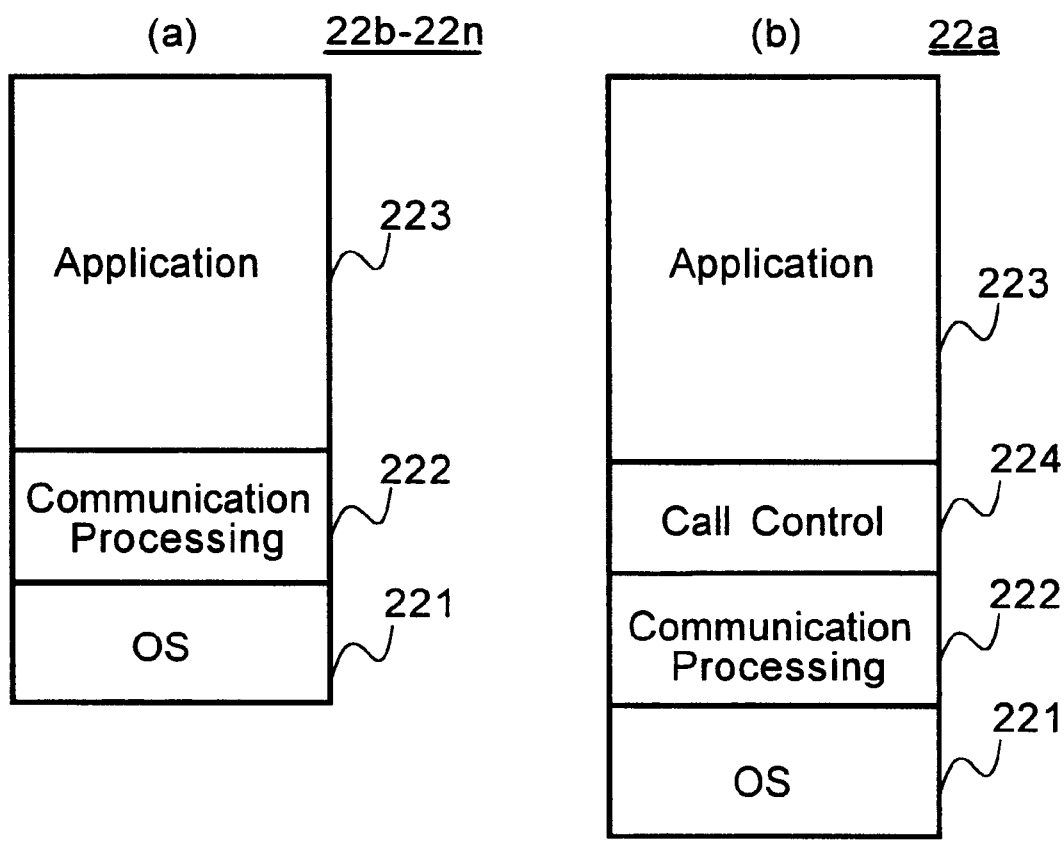
FIG. 4 is a diagram showing programs prepared in a memory of each terminal.

FIG. 4 shows programs mounted on the memory 22 of each terminal 2.

As shown in (a) of FIG. 4, each of ordinary terminals (ATM terminals) 2b through 2n other than the master terminal is equipped with an operating system (OS) 221, a program for communication processing (communication processing part) 222, and various application programs 223 for processing the information messages. On the other hand, the master terminal 22a is equipped with a call control program (call control part) 224 in addition to the OS 221, the communication processing part 222 and the application programs 223 as shown in (b).

Figure 5:
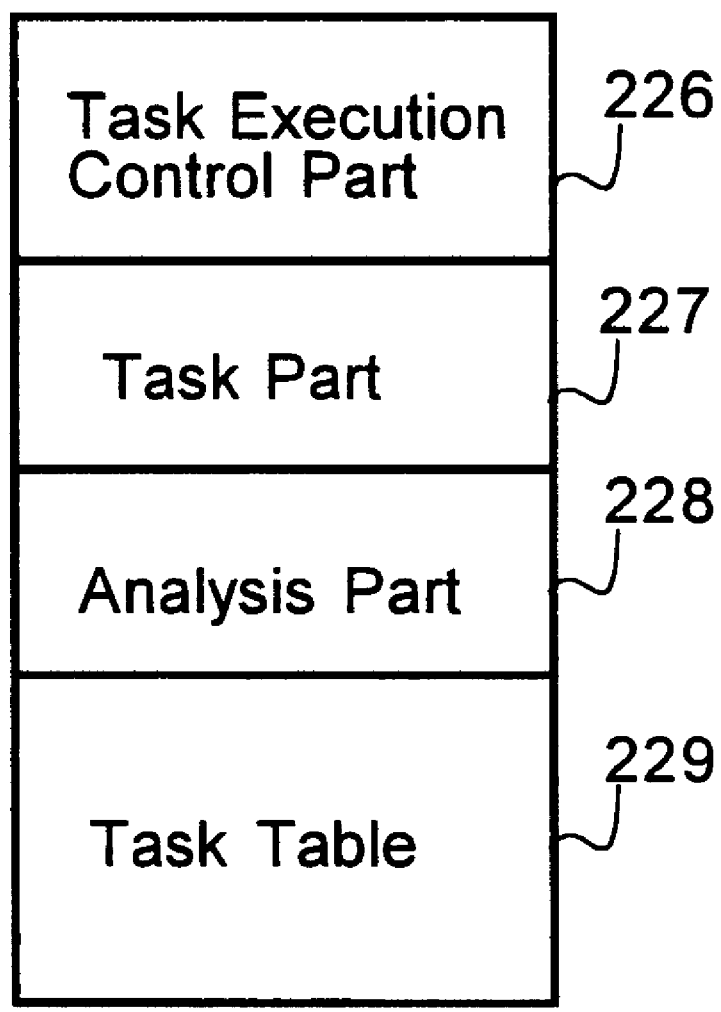
FIG. 5 is a diagram showing an example of contents of a call control program.

As shown in FIG. 5, the call control part 224 includes a task execution control part 226, a task part 227, an analysis part 228, and a task table 229.

Figure 6:
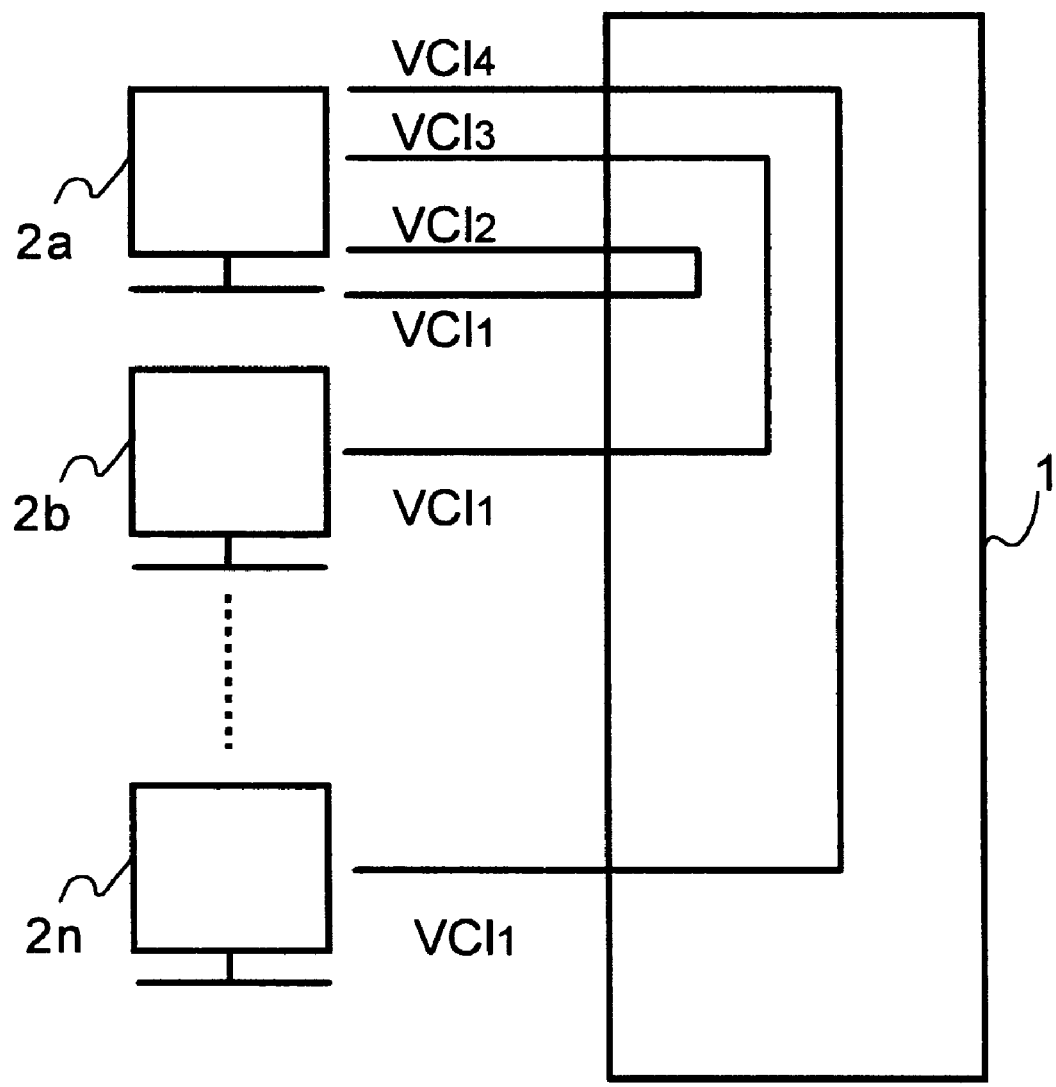
FIG. 6 is a diagram for explaining a method for setting a virtual channel in the first embodiment.

FIG. 6 shows an example of a virtual channel VC for signalling in the network illustrated in FIG. 1. The virtual channel VC for signalling is established between the master terminal 2a and other ordinary user terminals 2b through 2n via the ATM switchboard 1.

In the example of FIG. 6, virtual channels VC have been established respectively between the master terminal 2a functioning as the call controller and other terminals 2b, ..., 2n, and between the master terminal 2a functioning as the call controller and the terminal functioning as a user terminal. Values different from the values allocated to identifiers ($VCI_2$ through $VCI_4$) of the virtual channels between the master terminal 2a and the ATM switchboard 1 are allocated to identifiers ($VCI_1$) of the virtual channels between the originating/terminating terminals 2a through 2n and the ATM switchboard 1. By the above described header conversion function of each line associated unit, VCI conversion is conducted within the ATM switchboard.

Figure 7:
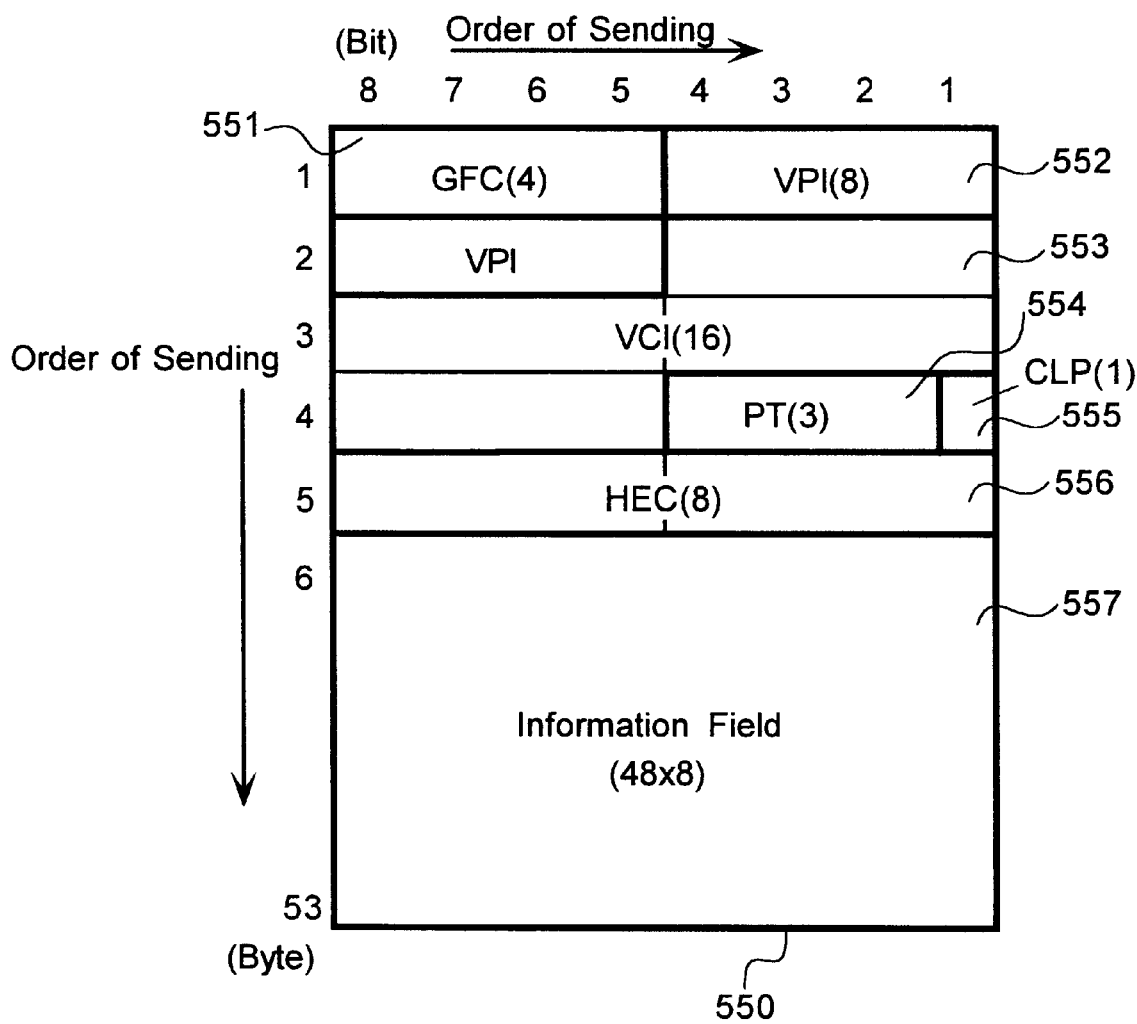
FIG. 7 is a diagram showing a format of an ATM cell (UNI) sent between a terminal and the ATM switch in the first embodiment.
Figure 8:
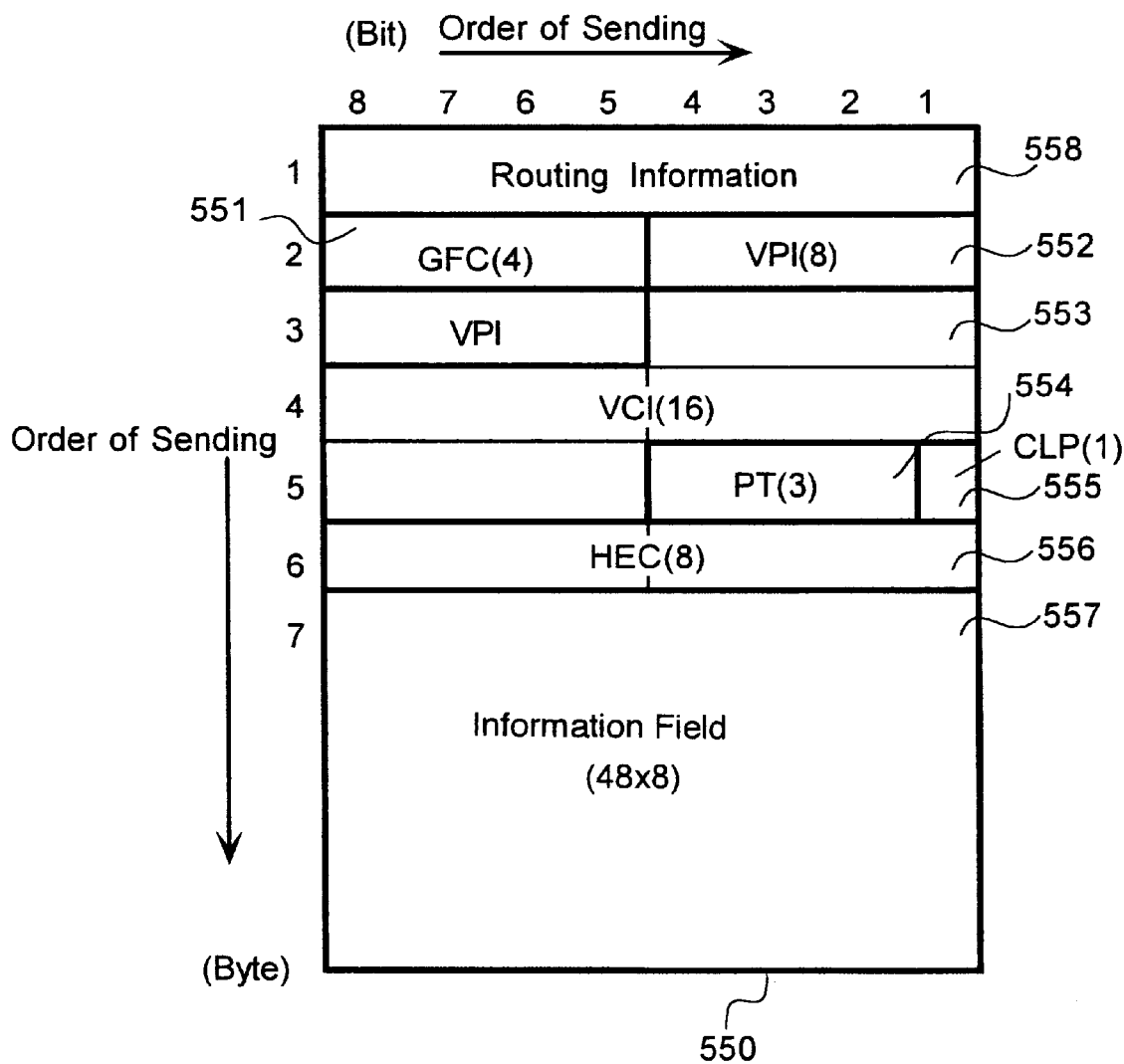
FIG. 8 is a diagram showing a format of an ATM cell transferred within the ATM switch in the first embodiment.

FIGS. 7 and 8 show formats of ATM cells.

Between the ATM switchboard 1 and each terminal 2, a fixed length packet (ATM cell) of 53 bytes having the UNI standard format of the ITU-T is applied as shown in FIG. 7. In other words, each ATM cell on the ATM line 3 has a header part of 5 bytes and an information field of 48 bytes. The header part includes a general flow control (GFC) field 551 of 4 bytes, a virtual path identifier (VPI) field 552 of 8 bytes, a virtual channel identifier (VCI) field 553 of 16 bytes, a payload type (PT) field 554 of 3 bytes, a cell loss priority (CLP) field 555 of 1 byte, and a header error control (HEC) field.

Within the ATM switchboard 1 (i.e., between the ATM line associated unit 12 and the ATM switch 11), a fixed length packet (internal cell) of 54 bytes is applied. As shown in FIG. 8, the fixed length packet of 54 bytes is obtained by adding an added header 558 of 1 byte to the head of the above described cell having the UNI standard format of the ITU-T.

Figure 9:
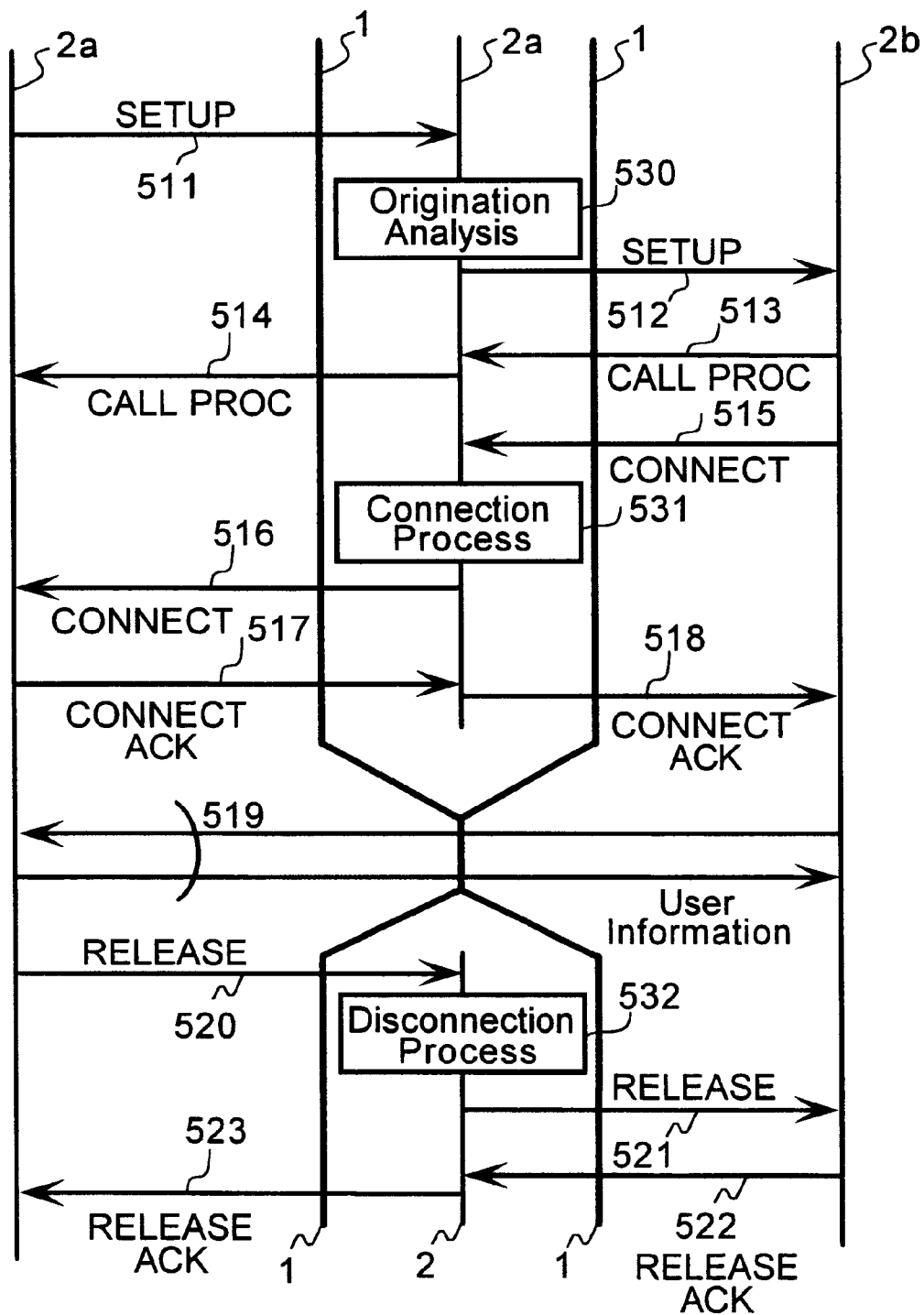
FIG. 9 is a diagram showing a signal sequence of a call process in a user-network interface (UNI) of the ATM exchange.

FIG. 9 shows a signal sequence of the call control operation in the case where inter-terminal communication is conducted in the communication network system of FIG. 1 with the master terminal 2a functioning as the originating terminal and the terminal 2b as the terminating terminal.

In an example of inter-terminal communication shown in the present embodiment, the master terminal 2a conducting the call control serves as an originating terminal, and a call control message sent out from the originating terminal onto an ATM line is folded back at the ATM switch 1 toward the master terminal (the originating terminal itself in this example) and processed by the call control part of the master terminal 2a. It is now assumed that the VCs for signalling between terminals have been preset as shown in FIG. 6.

If a call addressed to the terminal (terminating terminal) 2b occurs in the terminal (originating terminal) 2a, the application program 223 in the originating terminal 2a starts the communication processing program 222. A SETUP signal 511 is thus generated. The SETUP signal is converted to ATM cells having the format shown in FIG. 7 by an ATM adapter 23a, and sent out onto the connection line (input line) 3a.

These ATM cells are inputted to the line associated unit 12a of the ATM switchboard 1, converted to an electric signal by the O/E conversion unit 121, subjected to ATM synchronizing in the synchronous circuit 122, and then inputted to the delay circuit 123 and the input register 125. In the input register 125, the ATM header part (VPIi and VCIi) of the input cells is separated. By using the ATM header part (VPIi and VCIi) as a read address, output header information (VPIo, VCIo, and routing information) for signalling is read out from the label conversion table 126. By using the output header information read out from the label conversion table 126, the output register 124 rewrites the header part of the input cells supplied from the delay circuit 123. Thus, the output register 124 outputs the ATM cells subjected to header conversion having a routing information in the head part (added header part) 558 and containing the VPIo and VCIo peculiar to the originating terminal respectively in the VPI field and VCI field as shown in FIG. 8.

In the signalling area of the label conversion table 126 of each line associated unit 12, routing information is set beforehand so as to transfer the signalling ATM cells containing the SETUP signal in its information field to the output port 3a to which the master terminal 2a is connected. In the ATM switch 11, therefore, the ATM cells of the SETUP signal subjected to the header conversion are transferred to the output port 13a. In the output line interface circuit shown in FIG. 2, the added header (routing information) is deleted. Thereafter, resultant ATM cells are sent to the master terminal 2a via the ATM line 3a.

In the master terminal 2a, the ATM cells for call control representing the SETUP signal are assembled into a SETUP signal message by the ATM adapter 23, and thereafter transferred to the processor 21. Upon receiving the SETUP signal, the processor 21 starts the communication processing program 222 and the call control program 224.

In the call control program 224, the task execution control unit 226 determines a task according to the call state and the input signal, reads out a pertinent task macro group from the task table 229, and executes task macros one after another. In this example, the SETUP signal is received in the vacancy state, and a call originating task is started.

Figure 10:
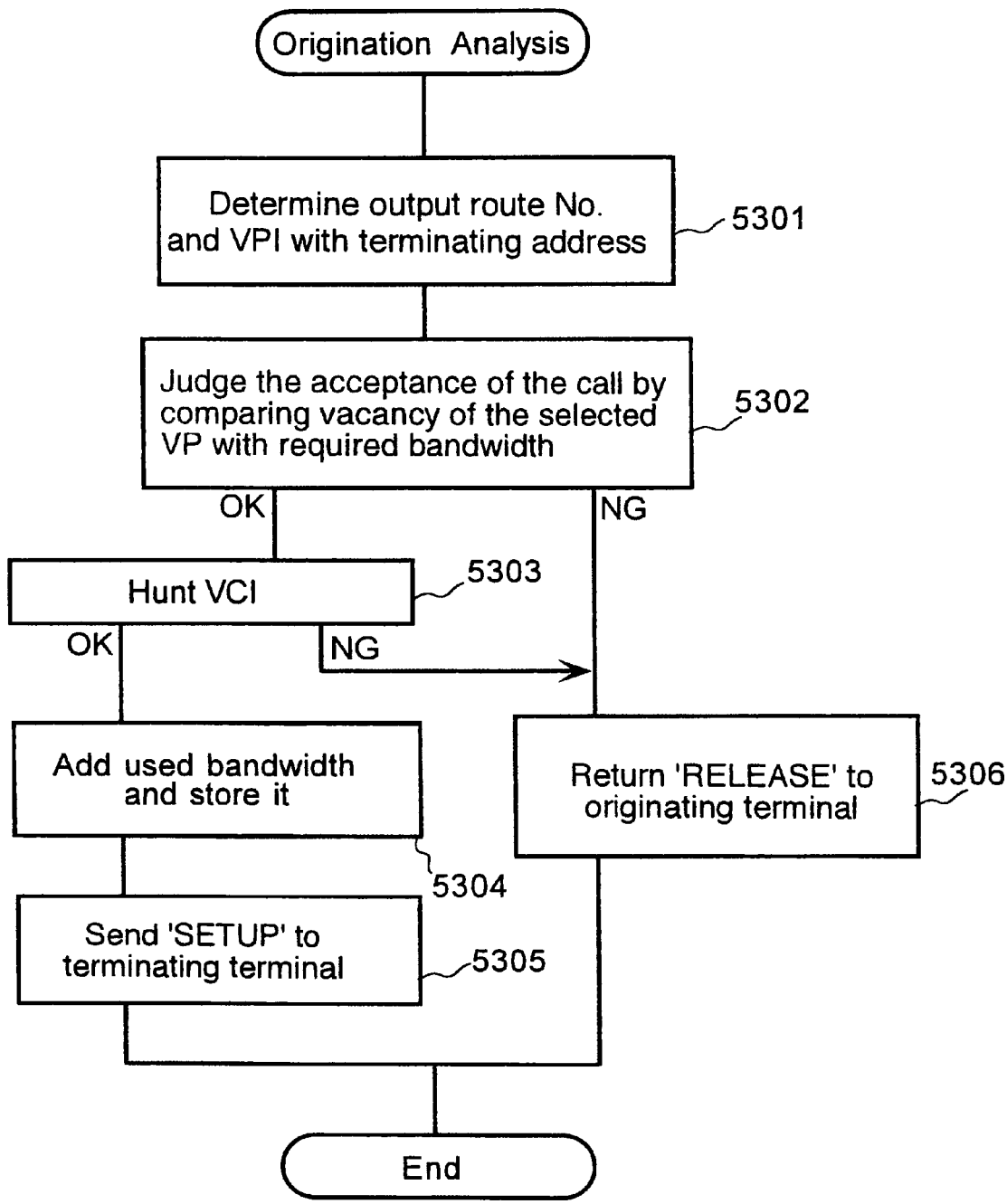
FIG. 10 is a flow chart showing details of an origination analysis process 530 illustrated in FIG. 9.

In the above described call originating task, an origination analysis processing routine 530 shown in FIG. 10 is executed. First of all, a terminal number table is searched on the basis of the address of the terminating terminal. An output route number and a VPI are determined (step 5301). Subsequently, a vacancy bandwidth of the virtual bus VP in the above described output route is compared with the bandwidth required by the call. It is thus judged whether the call can be accepted (step 5302).

If the call is acceptable, a VCI which is in the vacancy state is hunted (step 5303). The bandwidth to be used by the call is added to the value of the already used bandwidth of the above described output route, and a resultant sum is stored (step 5304). Thereafter, a SETUP signal 512 is sent to the terminating terminal 2b (step 5305). If the call acceptance is judged at the judgment step 5302 to be impossible, or if a VCI cannot be hunted at the step 5303, a RELEASE signal is returned to the originating terminal 2a (step 5306).

The SETUP signal 512 is converted to ATM cells by the ATM adapter 23a. The resultant ATM cells are transferred to the terminating terminal 2b via the switch 11. In the terminating terminal 2b, termination processing is conducted in response to the received SETUP signal 512 and thereafter a CALLPROC signal 513 is sent to the switchboard 1. In the switch 11, ATM cells representing the CALLPROC signal 513 are relayed to the master terminal 2a.

Upon receiving the CALLPROC signal 513, the master terminal 2a sends a CALLPROC signal 514 addressed to the originating terminal 2a to the ATM line 3a. Subsequently to the CALLPROC signal 513, the terminating terminal 2b generates a CONNECT signal 515 and sends the CONNECT signal 515 to the switchboard 1. The CONNECT signal 515 is relayed in the ATM switch 11 to the master terminal 2a. In response to the reception of the CONNECT signal 515, the master terminal 2a starts a connection process 531.

Figure 11:
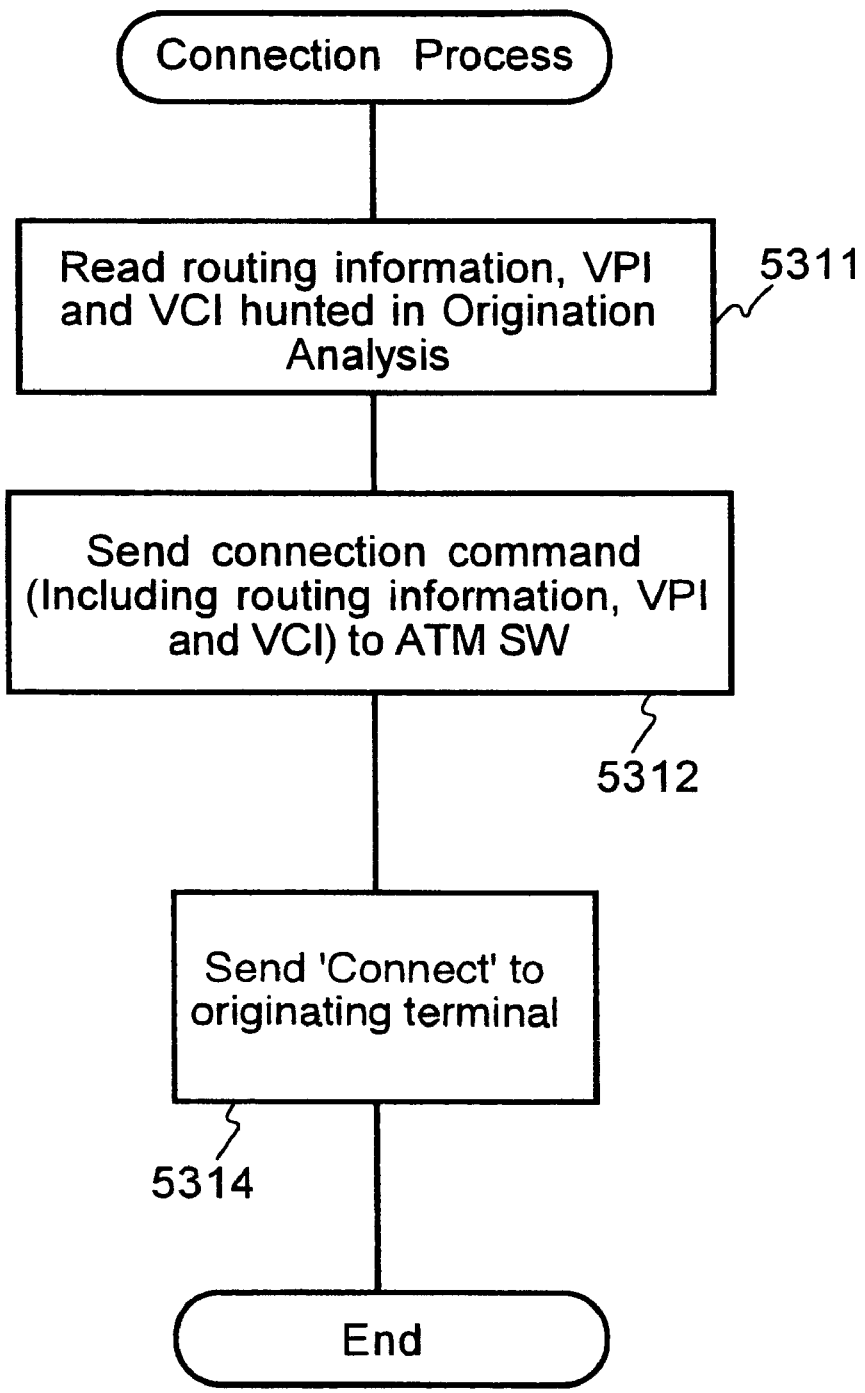
FIG. 11 is a flow chart showing details of a connection process 531 illustrated in FIG. 9.

In the connection process 531 as shown in FIG. 11, the routing information, VPI and VCI hunted in the origination process 530 are read out (step 5311). Connection command messages addressed to the line associated units 12a and 12b located on the connection and respectively containing the input VPIi/VCIi, output VPIo/VCIo and output routing information as control parameters are generated, converted to cells for signalling, and sent to the ATM switchboard 1 (step 5312). The ATM cells for signalling representing the connection command messages are relayed in the ATM switch 11 to the output ports 13a and 13b and terminated by respective signalling cell termination circuit 127. As a result, header information records required for header conversion of the cells for user information are set in the user information areas of the label conversion tables 126 of the line associated units to which the originating terminal and the terminating terminal are connected.

After the connection command has been sent, the master terminal 2a sends a CONNECT message 516 to the originating terminal 2a (5314). Upon receiving the CONNECT message 516, the originating terminal 2a returns a CONNECT ACK message 517. The ATM cells representing the CONNECT ACK message 517 are relayed in the ATM switch to the master terminal 2a. In response thereto, a CONNECT ACK message 518 is sent from the master terminal 2a to the terminating terminal 2b.

By the procedures heretofore described, a call is established between the originating terminal 2a and the terminating terminal 2b. From that time on, ATM cells for user information sent from one of the two terminals are subjected to header conversion in the line associated unit of the ATM switchboard 1 and transferred to the other terminal without being passed through the call control part of the master terminal.

If an operation for disconnecting the call is conducted in one of the two terminals, such as, for example, in the originating terminal 2a, ATM cells for signalling representing a RELEASE message 520 in its information field are sent from the originating terminal 2a. The ATM cells for signalling are relayed to the master terminal 2a by the ATM switchboard 1. Upon receiving the RELEASE message 520, the master terminal 2a starts a disconnection process routine 532.

Figure 12:
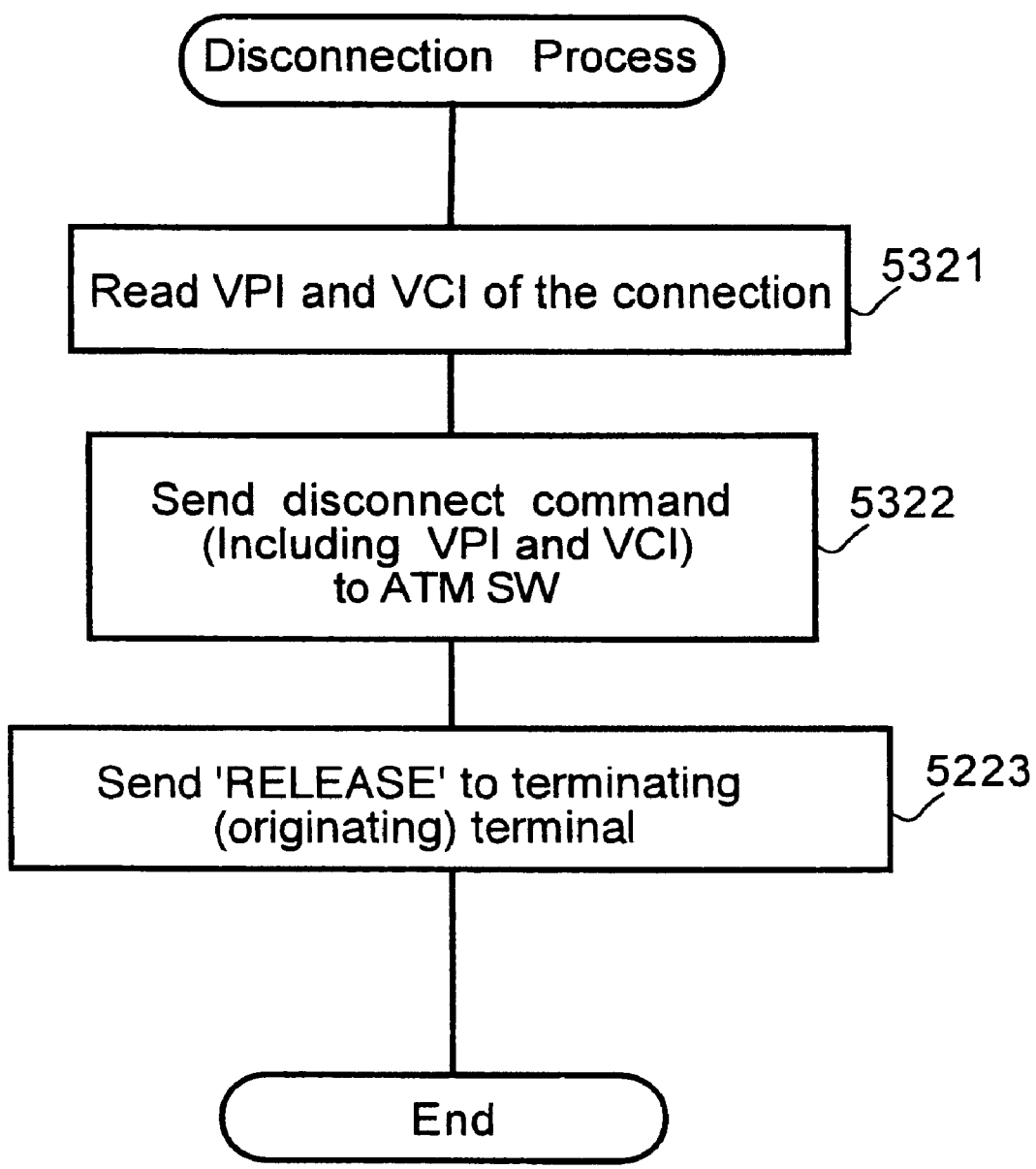
FIG. 12 is a flow chart showing details of a disconnection process 532 illustrated in FIG. 9.

In the disconnection process as shown in FIG. 12, the VPIi and VCIi of the connection are read out (step 5321), and a disconnection command having the VPIi and VCIi as parameters is generated and sent to the ATM switchboard 1 (step 5322). Thereafter, a RELEASE message 521 is sent to the terminating terminal 2b (step 5323). The signalling cells representing the disconnection command are terminated by the signalling cell termination circuits 127 of the line associated units 12a and 12b. As a result, the header information record of the disconnected call on the label conversion table 126 is erased.

Upon receiving the RELEASE message 521, the terminating terminal 2b generates a RELASE ACK signal 522 and sends it to the ATM switchboard 1. The signalling ATM cells containing the RELASEACK signal 522 are relayed to the master controller 2a by the ATM switch 11. Upon receiving the RELASEACK signal 522, the master terminal 2a sends a RELASEACK signal 523 to the originating terminal 2a. Signalling ATM cells containing the RELASEACK signal 523 are relayed to the originating terminal 2a by the ATM switch 11. Upon receiving it, the originating terminal (master terminal) 2a completes the call disconnection procedure by using the communication processing program 222.

Also in the case where the disconnection operation is conducted in the terminating terminal 2b, the disconnection process can be completed by following the same procedure as the foregoing description excepting that only the sending directions of the RELEASE signal 520 and the RELEASE ACK signal 522 are reversed.

In the foregoing embodiments, an example in which the inter-terminal communication is conducted with the master terminal 2a serving as the originating terminal has been described. Also in the case where a call is established between ordinary terminals other than the master terminal, however, the operation is the same as the foregoing embodiments excepting that the originating terminal 2a shown in FIG. 9 is replaced by another terminal such as, for example, the terminal 2n. Signalling ATM cells sent from each terminal are relayed in the ATM switch to the master terminal 2a. It is evident that the call establishment and disconnection can thus be implemented by the call control function of the master terminal.

A second embodiment of a communication network system according to the present invention in which the call control of an ATM switchboard connected to another exchange via a trunk line is conducted by the master terminal will now be described.

As compared with the ATM switch which forms the user-network interface (UNI) for connection between user terminals shown in the first embodiment, the ATM switchboard which forms the network-network interface (NNI) for interconnecting exchanges (networks) has the following differences.

Figure 13:
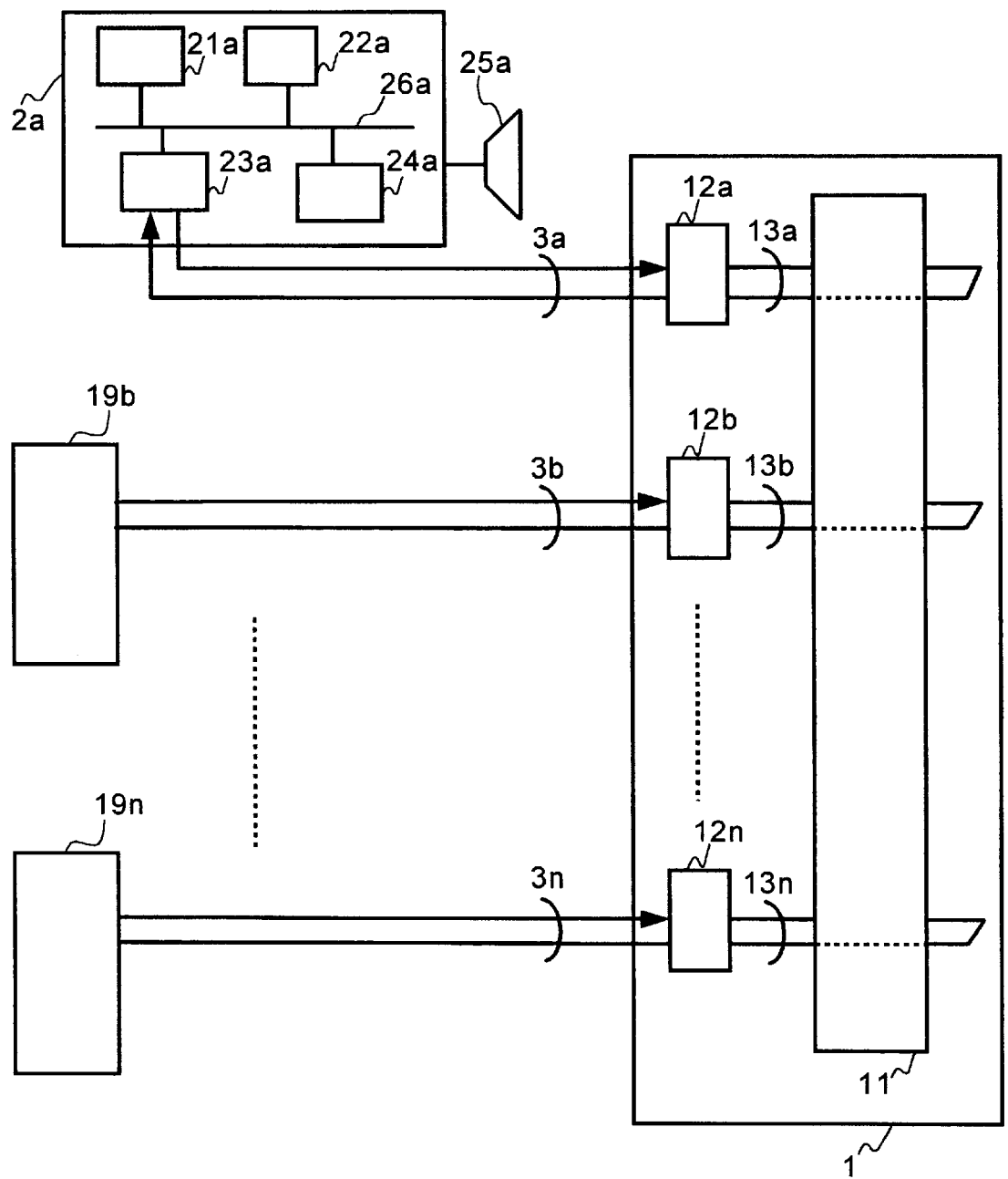
FIG. 13 is a configuration diagram showing a second embodiment of a packet communication network including an ATM switch having a network-network interface (NNI) function according to the present invention.

(1) In the case of the ATM switchboard forming an NNI, the ATM lines 3b through 3n other than the ATM line 3a for connecting the master terminal 2a serve as the trunk lines for accommodating other ATM exchanges 19 (19b through 19n) which form other networks as shown in FIG. 13.

(2) The master terminal 2a for conducting the call control of the ATM switchboard 1 has the communication processing program 222 and the call control program 224 for conducting the NNI control in the memory 22.

Figure 14:
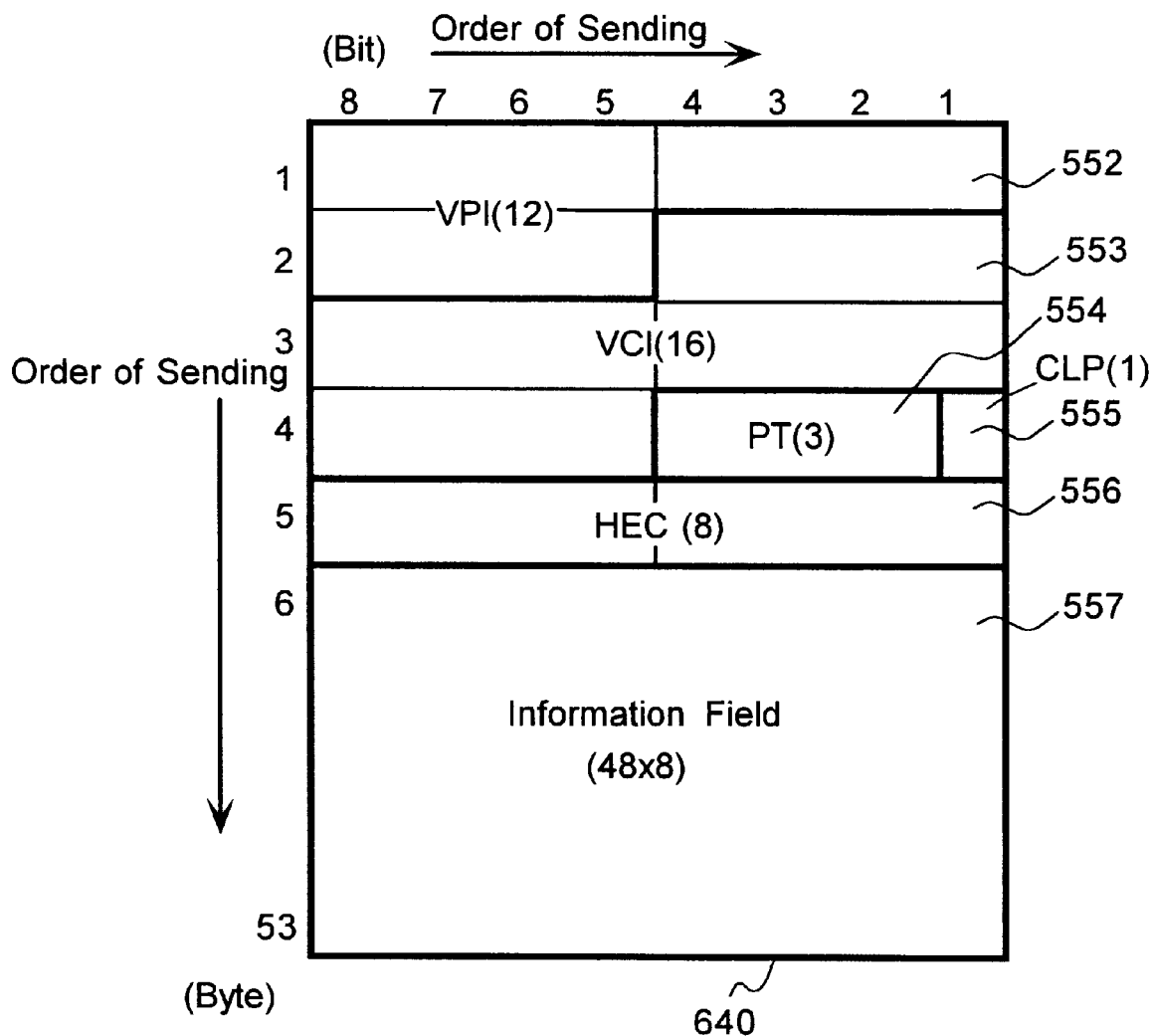
FIG. 14 is a diagram showing a format of an ATM cell (NNI) sent between ATM exchanges in the second embodiment.
Figure 15:
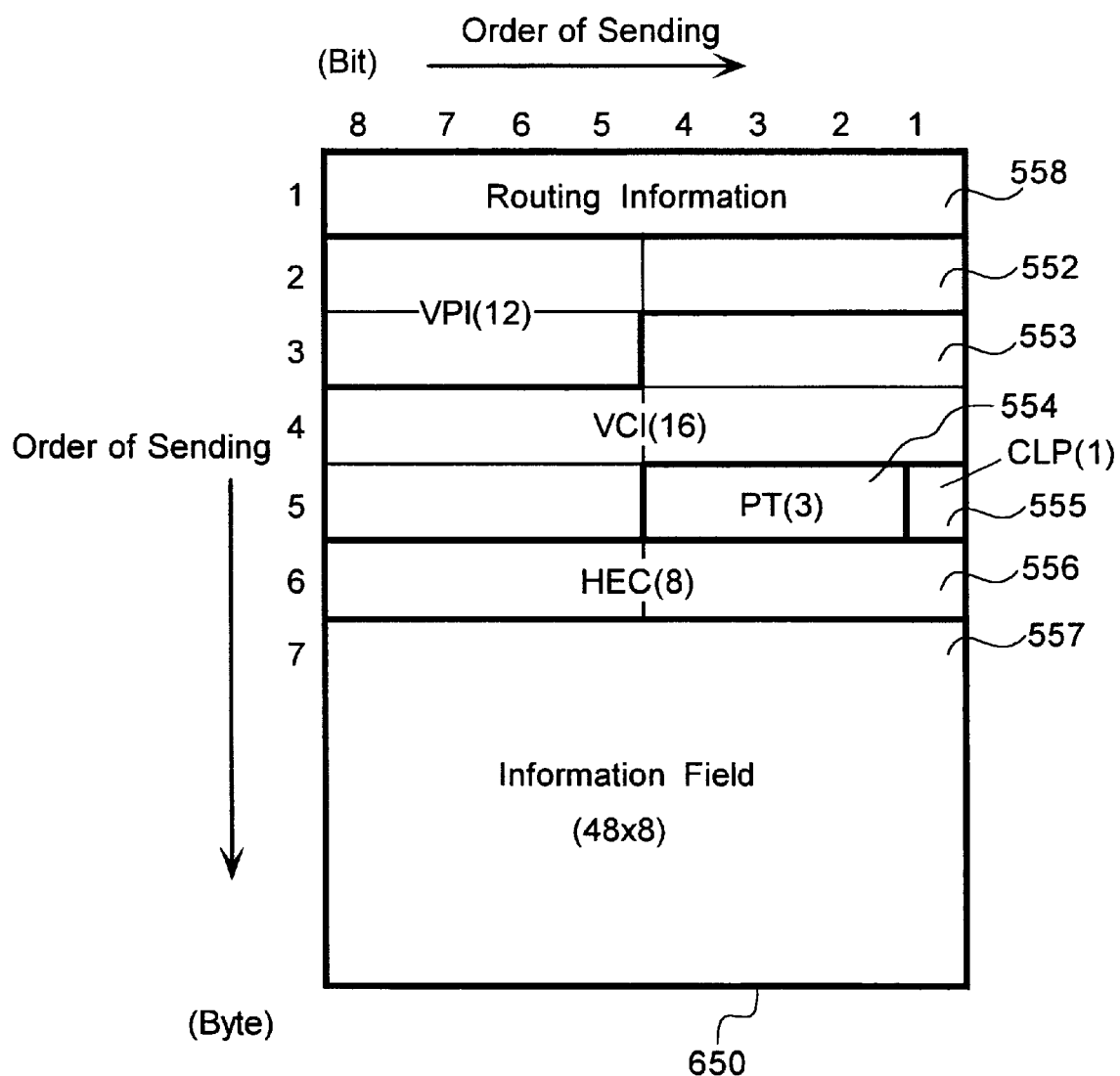
FIG. 15 is a diagram showing a format of an ATM cell transferred within an ATM exchange in the second embodiment.

(3) As shown in FIG. 14, ATM cells communicated in the NNI via an ATM line has the NNI standard format of ITU-T having a length of 53 bytes and containing the VPI field 552 of 12 bits in the header part. In the ATM switchboard 1, a format having a length of 54 bytes is used as shown in FIG. 15. The format is obtained by adding the added header 558 of 1 byte representing the routing information at the head of a cell having the NNI standard format of the ITU-T.

Figure 16:
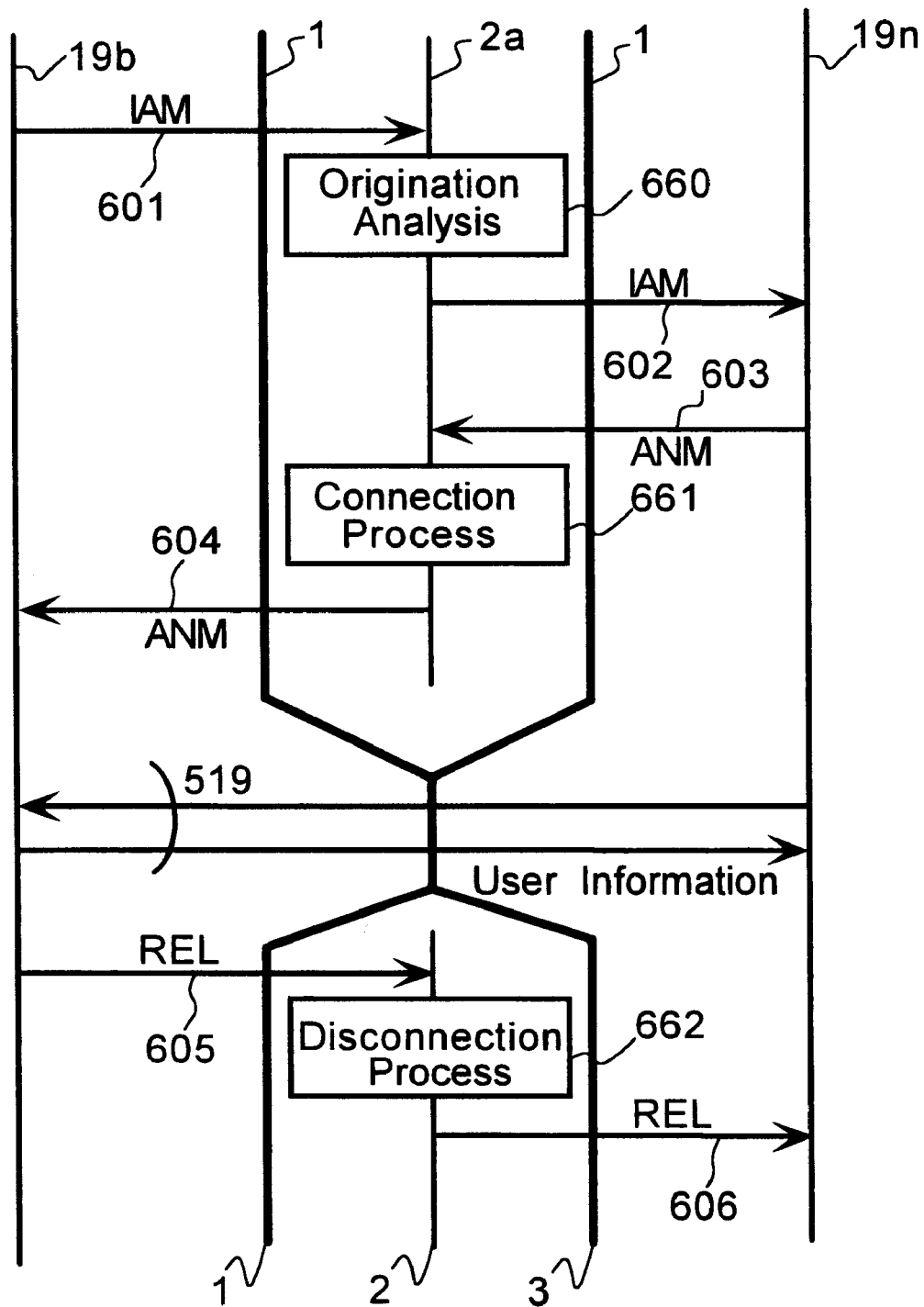
FIG. 16 is a diagram showing a signal sequence of a call process in a network-network interface (NNI) of the ATM exchange.

FIG. 16 shows the signal sequence of a call control operation conducted when an exchange 19b serves as an originating exchange and an exchange 19n serves as a terminating exchange in the network of FIG. 13.

If a call addressed to the exchange 19n occurs in the exchange 19b, the ATM cells of FIG. 14 containing an IAM signal are transferred from the exchange 19b to the ATM switchboard 1. In the line associated unit 12b of the ATM switchboard 1, the ATM cells are converted to an electric signal by the O/E conversion unit 121, subjected to ATM synchronization in the synchronous circuit 122. Thereafter, the inputs VPIi and VCIi for signalling are separated from the header part of the ATM cells in the input register 125.

In the signalling area of the label conversion table 126, the routing information representing the output line number to which the master terminal 2a for call control is connected and the values of the outputs VPIo and VCIo are set beforehand in association with the inputs VPIi and VCIi for signalling. By accessing the label conversion table 126 on the basis of the inputs VPIi and VCIi extracted from the ATM cells, the outputs VPIo and VPIo for signalling and the routing information are read out and supplied to the output register 124.

As a result, header conversion of the input cells is conducted in the output register 124. An ATM cell having the added header (routing information) 558, the VPIo 552, and VCIo 554 is thus inputted to the ATM switch 11. The ATM cells are relayed in the ATM switch 11 to the output port 13a. After the added header 558 has been removed in the output interface circuit of the line associated unit 12, resultant ATM cells are sent to the ATM line 3a.

The ATM cells having the IAM signal in the user part are assembled into a message by the ATM interface 23 of the master terminal 2a and delivered to the processor 21. Upon receiving the IAM signal message, the processor 21 starts the communication processing program 222 and the call control program 224 stored in the memory 22a.

Figure 17:
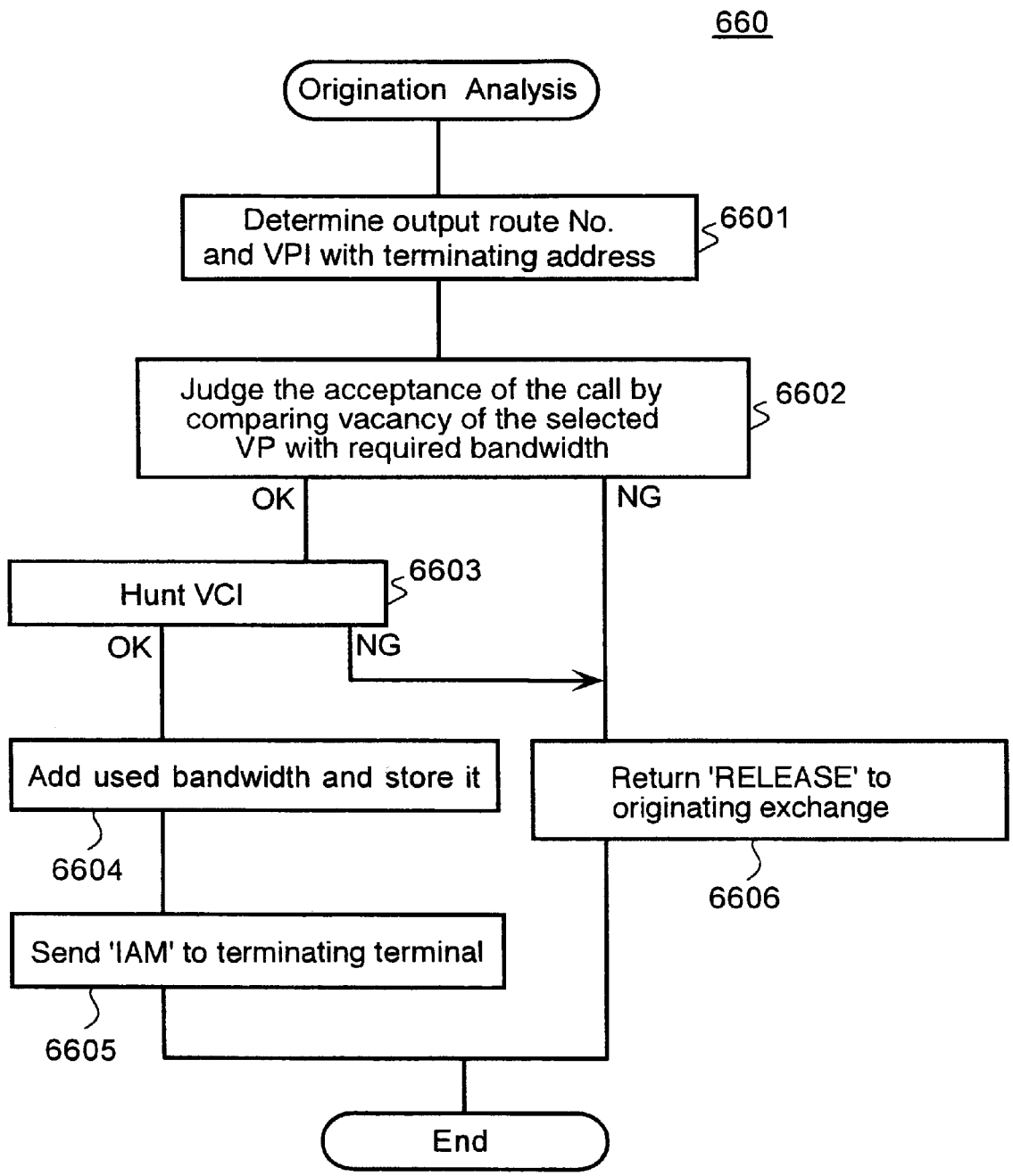
FIG. 17 is a flow chart showing details of an origination analysis process 660 illustrated in FIG. 16.

When the call control program 224 is started, the task execution control part 226 determines a task on the basis of the call state and the input signal (IAM), reads a pertinent task macro group from the task table 229, and executes the task macros one after another. In this example, an IAM signal 601 is received in the vacancy state. Therefore, a call originating task is started, and an origination analysis routine 660 shown in FIG. 17 is executed.

In the origination analysis 660, the output route number and the VPI are first determined on the basis of the address of the terminating exchange contained in the received IAM signal (step 6601).

Subsequently, a vacancy bandwidth of the virtual bus VP in the above described output route is compared with the bandwidth required by the call which has occurred lately. It is thus judged whether the call can be accepted (step 6602).

If the call is acceptable, a VCI which is in the vacancy state is hunted (step 6603). The bandwidth to be used by the call is added to the value of the already used bandwidth in the above described VP, and a resultant sum is stored (step 6604). In addition, an IAM signal 602 is sent to the terminating terminal 19n (step 6605). If the call acceptance is judged to be impossible, or if a VCI cannot be hunted, a REL signal is returned to the originating exchange 19a (step 6606).

The ATM cells containing the IAM signal 602 are relayed to the terminating exchange 19b by the ATM switchboard 1. The terminating exchange 19b conducts the termination processing in response to reception of the IAM signal, and thereafter sends an ANM signal 603 to the ATM exchange system.

The ATM cells containing the ANM signal 603 are relayed to the master terminal 2a by the ATM switchboard 1. In response to reception of the ANM signal, the master terminal starts a connection process routine 661 shown in FIG. 18.

In the connection process 661, the routing information, VPI and VCI already hunted in the origination process are read out (step 6611). A connection command containing the inputs VPIi and VCIi, outputs VPIo and VCIo, and output routing information as the control parameters addressed to each line associated unit on the connection is sent to the ATM switchboard 1 (step 6612). An ANM message 604 is sent to the originating exchange 19b (step 6614). The above described connection command is terminated by the line associated units 12b and 12n. As a result, control parameters (output header information) for the header conversion of the user information cells are set in each label conversion table so as to be associated with the input connection identifier attached to the user information cells.

By the procedures heretofore described, a call is established between the originating exchange 19b and the terminating exchange 19n. From that time on, ATM cells containing user information are directly exchanged between the two exchanges via the ATM switchboard 1 without passing through the master terminal 2a.

Figure 19:
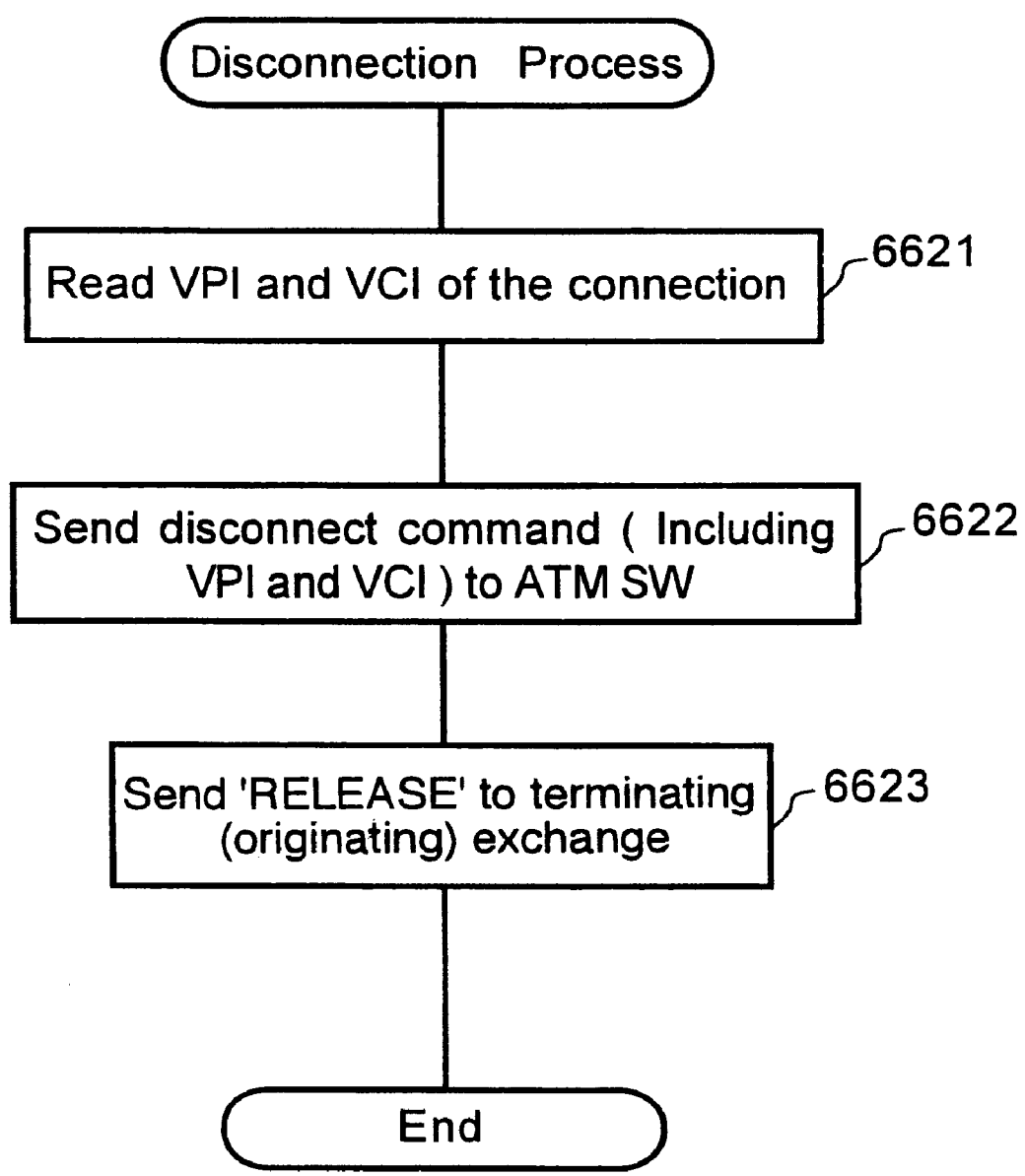
FIG. 19 is a flow chart showing details of a disconnection process 662 illustrated in FIG. 16.

If an operation for disconnecting the call is conducted in a terminal connected to some exchange, such as, for example, the originating exchange 19b, a REL message 605 is sent from the originating exchange 19b to the ATM switchboard 1. The ATM cells containing the REL message 605 are relayed in the ATM switchboard 1 to the master terminal 2a. Upon receiving the REL message 605, the master terminal 2a starts a disconnection process routine 662 shown in FIG. 19.

In the disconnection process 662, the VPIi and VCIi of the connection required to be disconnected are read out (step 6621), and a disconnection command having the VPIi and VCIi as parameters is sent to the line associated unit 12b to which the originating exchange 19b is connected and the line associated unit 12n to which the terminating exchange 19n is connected (step 6622). A REL message 606 is sent to the terminating exchange 19n (step 6623).

The ATM cells for signalling containing the above described disconnection command are relayed to the output ports 13a and 13b by the ATM switch 11. In the line associated units 12b and 12n, these ATM cells for signalling are terminated by the signalling cell termination circuit 128. Parameters stored in respective label conversion tables 126 and specified by the disconnection command are erased. As a result, the disconnection procedure is completed.

Also in the case where the disconnection operation is conducted in the terminating terminal of the terminating exchange 19n, the disconnection process is completed by following the same procedure.

Figure 20:
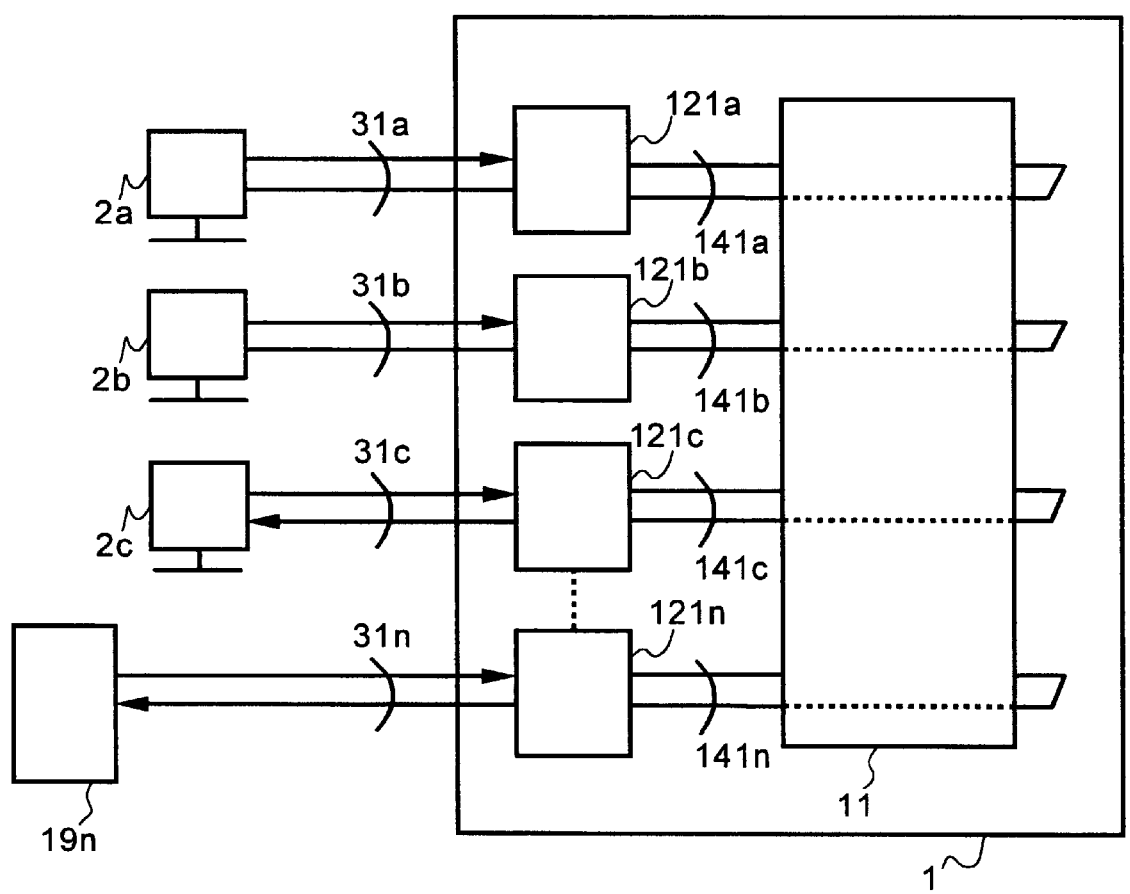
FIG. 20 is a configuration diagram showing a third embodiment of a packet communication network including an ATM switch having a user-network interface (UNI) function and a network-network interface (NNI) function according to the present invention.

FIG. 20 shows a third embodiment of the present invention in which the ATM switchboard 1 has the user-network interface function and the network-network interface function, and a plurality of terminals and at least one exchange are accommodated.

In this example, each of two terminals 2a and 2b connected respectively to ATM lines 31a and 31b is equipped with the call control program 224, and the terminals 2a and 2b function as first and second master terminals, respectively. In remaining ATM lines 31c through 31n, ordinary terminals, such as 2c, which are not equipped with the call control program 224 or other exchanges such as 19n are accommodated.

The first master terminal 2a is provided for the user-network interface (UNI). The memory 22a is provided with the programs shown in (b) of FIG. 4. Each of the communication processing program 222 and the call control program 224 has the UNI control function described with reference to the first embodiment.

On the other hand, the second master terminal 2b is provided for the network-network interface (NNI). The memory 22b is provided with the programs shown in (b) of FIG. 4. Each of the communication processing program 222 and the call control program 224 has the NNI control function described with reference to the second embodiment.

On the ATM line 31c accommodating the ordinary terminal and the ATM line 31a accommodating the first master terminal 2a, ATM cells of 53 bytes having the UNI standard format of the ITU-T shown in FIG. 7 are exchanged. Between the ATM line associated units 121a and 121c connected to these lines and the ATM switch 11, ATM cells of 54 bytes having the format shown in FIG. 8 are exchanged.

On the ATM line 31n connected to another exchange and the ATM line 31b accommodating the second master terminal 2b, ATM cells of 53 bytes having the NNI standard format of the ITU-T shown in FIG. 14 are exchanged. Between the ATM line associated units 121b and 121n connected to these lines and the ATM switch 11, ATM cells of 54 bytes having the format shown in FIG. 15 are exchanged.

In the above described communication network, the first master terminal 2a conducting the call control of the user-network interface executes the call control sequence shown in FIG. 9, whereas the second master terminal 2b conducting the call control of the network-network interface executes the call control sequence shown in FIG. 16. As a result, calls between arbitrary ATM lines can be controlled. In the above described embodiment, two terminals are provided for the NNI and UNI. However, these functions may be conducted by a single master terminal.

Figure 21:
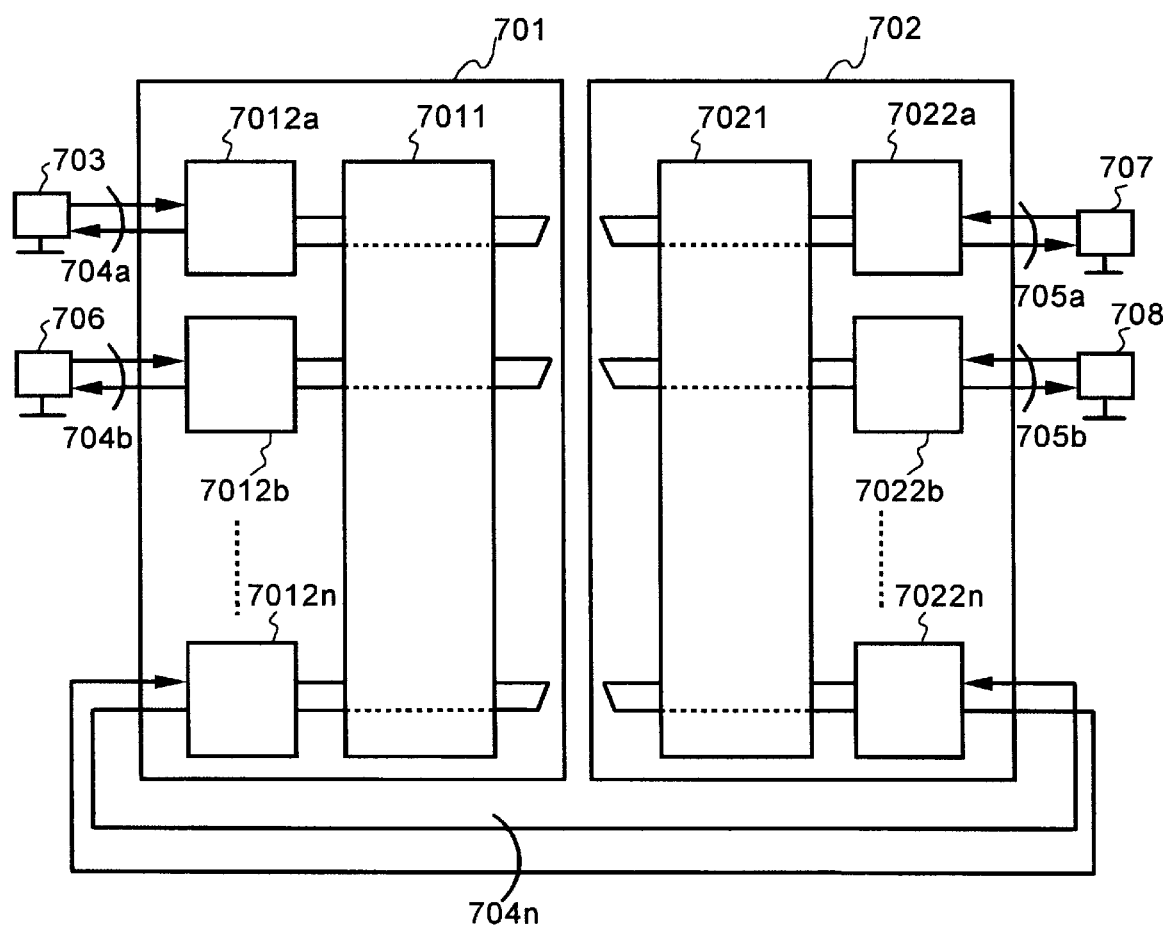
FIG. 21 is a diagram showing a fourth embodiment of a network according to the present invention.

FIG. 21 shows a fourth embodiment of the present invention in which a plurality of ATM switchboards (i.e., first and second switchboards 701 and 702) are controlled by one master terminal 703 for call control. The master terminal 703 is connected to the first switchboard 1 via an ATM line 704a.

The first ATM switchboard 701 includes an ATM switch 7011 and a plurality of line associated units 7012 (7012a through 7012n). Each line associated unit 7012 is connected to a line 704a for accommodating the master terminal 703, a line 704b for accommodating another ordinary user terminal, or a line 704n for connection with another ATM switchboard 702.

The second ATM switchboard 702 includes an ATM switch 7021 and a plurality of line associated units 7022 (7022a through 7022n). Each line associated unit 7022 is connected to one of lines 705a and 705b for accommodating ordinary user terminals, and a line 705n connected to another ATM switchboard 701.

The master terminal 703 controls the first and second ATM switchboards 701 and 702, and stores the programs shown in FIG. 4 in its internal memory 22. The communication processing program 222 and the call control program 224 have the call control functions of the UNI and NNI.

Figure 22:
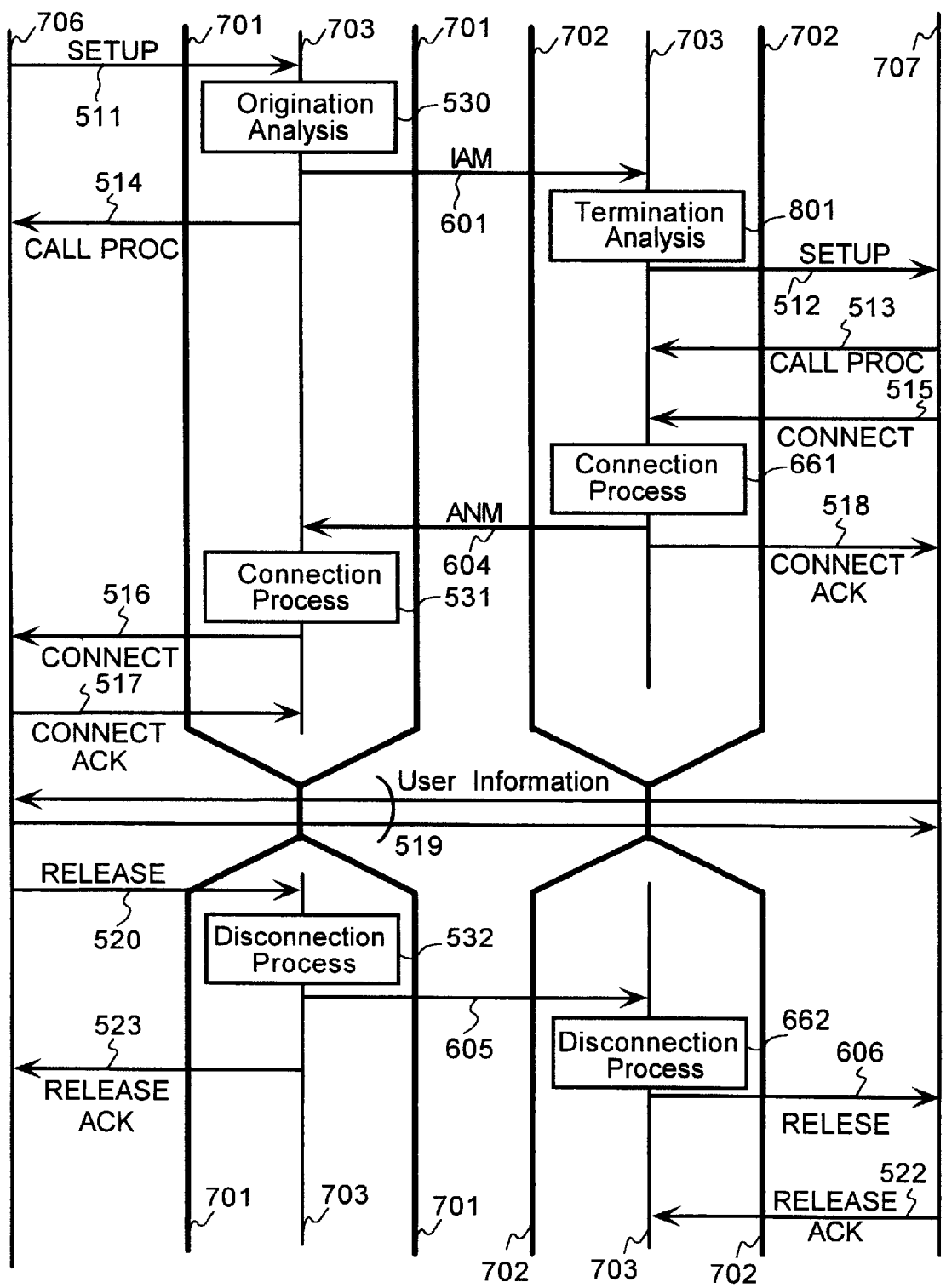
FIG. 22 is a diagram showing a signal sequence of a call process in the fourth embodiment.

FIG. 22 shows the signal sequence for controlling a call originated by a terminal 706 and terminated by a terminal 707 in the system configuration of FIG. 21.

If the originating terminal 706 sends the SETUP message 511, ATM cells for signalling containing this message are relayed to the master terminal 703 by the first ATM switchboard 701.

Upon receiving the SETUP message 511, the master terminal starts the origination analysis 530. As a result of translation of a dial number in the origination analysis, it is found that the call should be passed through the first ATM switchboard 702.

In this case, the master terminal 703 generates an inter-office activation signal (IAM) 601, and sends it to the first ATM switchboard 701. ATM cells for signalling containing the IAM 601 are relayed in the first ATM switchboard 701 to the ATM trunk line 704n and transferred to the second ATM switchboard 702.

Via a virtual path for signalling established beforehand between the second ATM switchboard 702 and the master terminal, the second ATM switchboard 702 sends the IAM 601 to the master terminal 703. The master terminal 703 terminates the IAM signal and starts a termination analysis 801. As a result, the terminal 707 is determined as the terminating terminal and the SETUP signal 512 is sent toward the terminal 707.

In response to reception of the SETUP signal 512, the terminating terminal 707 returns the CALLPROC message 513, and subsequently sends the CONNECT message 515. ATM cells representing these signals are relayed to the master terminal 703 via the second ATM switchboard 702.

Figure 18:
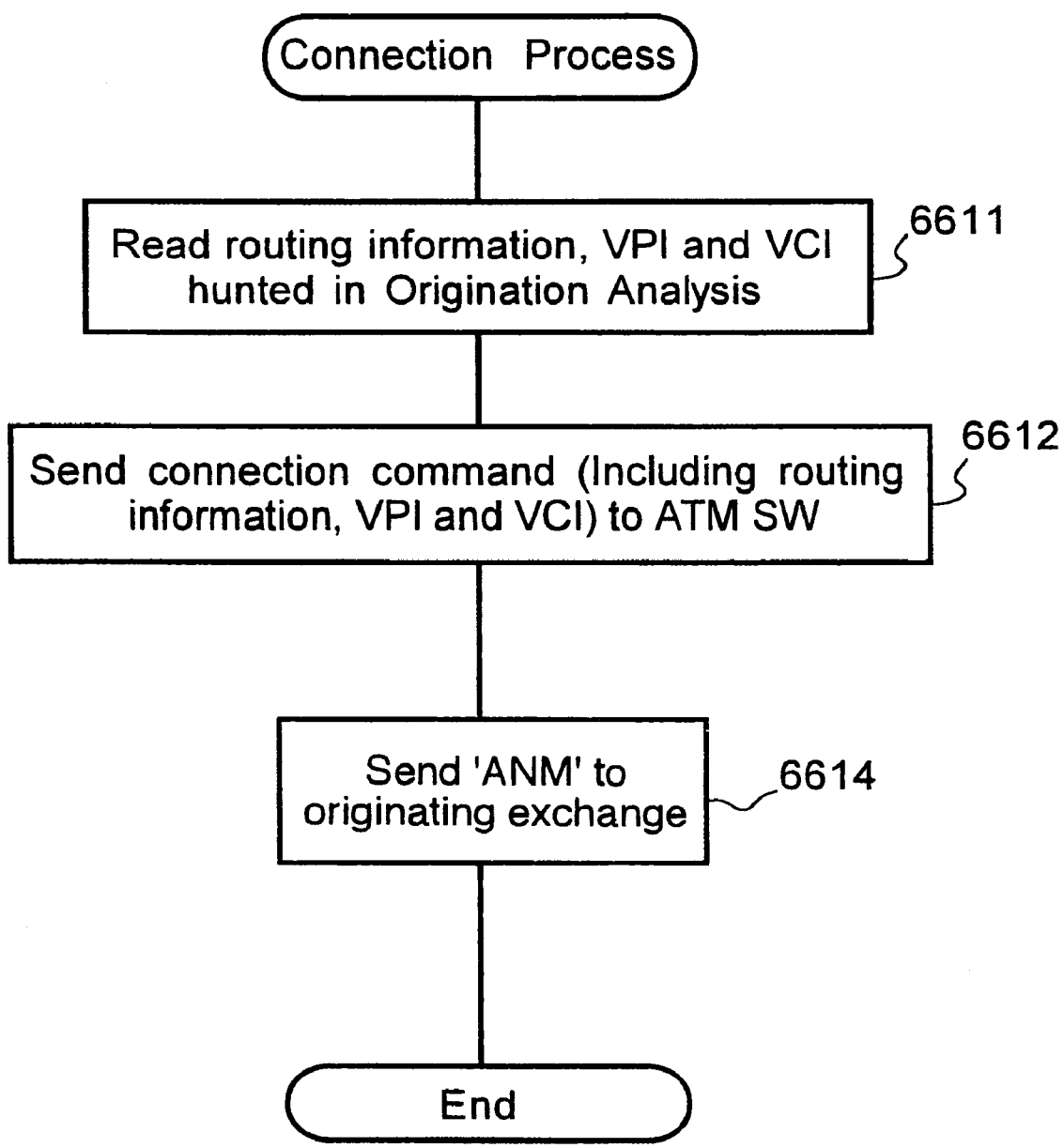
FIG. 18 is a flow chart showing details of a connection process 661 illustrated in FIG. 16.

Upon receiving the CONNECT signal, the master terminal 703 starts the connection process 661 in the second ATM switchboard 702, and sends the connection command described with reference to FIG. 18 to the second ATM switchboard 702. The master terminal 703 sends an ANM message to the ATM switchboard 701 of the originating side, and sends the CONNECT ACK 518 to the terminating terminal 707.

ATM cells representing the ANM message arrive at the master terminal 703 via the first ATM switchboard 701, and the connection process 531 in the first ATM switch is started. As a result, the connection command described with reference to FIG. 18 is sent to the ATM switchboard 701 of the originating side, and the CONNECT message 516 is sent to the originating terminal 706. The originating terminal 706 sends the CONNECT ACK message 517. If the master terminal 703 receives it, the call establishment is completed.

The two terminals 706 and 707 of the originating side and the terminating side can exchange ATM cells containing the user information 519 via channels formed by the call establishment. If a disconnection operation is conducted in any of the terminals, such as, for example, in the terminal 706 of the originating side, the RELEASE signal (message) is sent. ATM cells for signalling representing the RELEASE signal are relayed to the master terminal 703 by the first ATM switchboard 701.

Upon receiving the RELEASE signal 520, the master terminal 703 starts the disconnection 662 in the first ATM switchboard, and conducts the disconnection operation for the ATM switchboard 701 of the originating side. Thereafter, the master terminal 703 sends the REL message 605 to the ATM switchboard 702, and sends the RELEASE ACK 523 to the originating terminal 706.

ATM cells for signalling representing the REL signal 605 are relayed to the trunk line 704n by the first ATM switchboard 701 and transferred to the second ATM switchboard 702. Via a virtual path for signalling established beforehand between the second ATM switchboard 702 and the master terminal 703, the second ATM switchboard 702 relays the above described ATM cells representing the REL signal 605 to the master terminal 703. In response to reception of the REL signal, the master terminal starts the disconnection process 662 to conduct the disconnection processing for the second ATM switchboard 702, and sends the RELESE message 606. Upon receiving a RELEASE ACK message from the terminating terminal, the master terminal 703 completes the call control procedure conducted between the terminals.

In the example of the foregoing embodiment, one master terminal having the call control function conducts call control of two ATM switchboards. Denoting the processing capability of the master terminal by A (MIPS), the call processing capability needed by each ATM switchboard by B (call/sec), and the number of dynamic steps needed for each call processing by C (step/call), the number S of switchboards which can be controlled by one master terminal can be represented by the following equation.

$$S = A/(B \cdot C)$$

Therefore, if it is now assumed that the processing capability of the master terminal is 1,000 MIPS, the processing capability needed by each ATM switchboard by 100 call/sec, and the number of dynamic steps needed for each call processing by 100 k step/call, then 100 ATM switches can be controlled by one master terminal. If the number of exchanges to be controlled is less than this, then the extra capability of the mask terminal can be appropriated to data processing peculiar to the terminal, and the user can utilize the above described master terminal as an ordinary work station. In addition, by utilizing the data processing capability saved by the call control, it becomes possible to conduct maintenance works, such as changes of call control programs and service programs and addition of functions, in the master terminal without interrupting the service of the switchboards.

INDUSTRIAL APPLICABILITY

It is understood from the foregoing description that in accordance with the present invention one of the terminals having the function of conducting the packet (ATM cell) communication with another terminal via an exchange line is specified as the master terminal and processing programs required for the call control of the packet exchange are mounted on the master terminal. As a result, a dedicated call controller is excluded from the packet exchange, and the user can use the master terminal as an ordinary terminal.

Therefore, the present invention makes it possible to provide a communication network for connecting a plurality of terminals at a moderate cost and facilitate the update work of service functions of exchanges. Its industrial application effects are extremely large.

What is claimed is:

1. A terminal for communicating with another terminal via a switchboard, characterized in that:

said terminal comprises a processor, communication control means for sending/receiving packets to/from a line connected to said switchboard, and a call control program for conducting call control in said switchboard;

said communication control means converts a call control message and a user information message generated in said terminal respectively to signalling packets and user information packets, sends said signalling packets and said user information packets to said line, and converts signalling packets and user information packets received from said line via said switchboard respectively to a call control message and a user information message; and in response to a call control message supplied from said terminal or another terminal and converted from the received packets by said communication control means, said processor executes said call control program and performs call control including update of control parameters required for a packet exchange operation in said switchboard.

2. A terminal according to claim 1, characterized in that:

said call control program comprises an origination analysis process routine to be executed in response to a call establishment request message, a connection process routine to be executed in response to a connection request message, and a disconnection process routine to be executed in response to a disconnection process routine; and if a call control message converted from the received packets by said communication control means is a connection request message, then said processor executes said connection process routine and notifies said switchboard of control parameters required for the exchange operation of packets communicated on one connection specified by said connection request message.

3. A terminal according to claim 1, characterized in that:

the terminal has an application program for sending/receiving a result of data processing to/from another terminal as an information message;

in response to an information message sent from another terminal and converted from received packets by said communication control means, said processor executes said application program.

4. A terminal according to any one of claims 1 to 3, characterized in that said communication control means sends/receives said packets to/from said switchboard in an asynchronous transfer mode (ATM) cell form of fixed length.

5. A communication network system including a plurality of pairs of connection lines each having an input line and an output line, a switchboard for relaying packets received from an arbitrary input line to some output line determined by header information of the packets, and a plurality of terminals coupled to said switchboard via said connection lines, characterized in that:

each of said terminals has communication control means for converting a call control message to be sent to said switchboard and an information message to be sent to another terminal to packets of predetermined formats, sending the packets to said input line, and converting packets received from said output line via said switchboard to messages;

a master terminal which is one of said plurality of terminals has call control means for conducting call control of said switchboard;

said switchboard has means for selectively relaying packets for signalling received from said each input line to said master terminal; and in response to a call control message converted from the received packets by said communication control means, said master terminal actuates said call control means and performs call control including a status shift of each call and update of control parameters required by said switchboard for a packet exchange operation.

6. A communication network system according to claim 5, characterized in that a plurality of terminals other than said master terminal are connected to said switchboard via some other exchange connected to said plurality of connection lines, and said call control means conducts call control between said switchboard and said other exchange.

7. A communication network system according to claim 5 or 6, characterized in that:

said call control means comprises an origination analysis process routine to be executed in response to a call establishment request message, a connection process routine to be executed in response to a connection request message, and a disconnection process routine to be executed in response to a disconnection process routine; and if a call control message converted from the received packets by said communication control means is a connection request message, then said master terminal executes said connection process routine and notifies said switchboard of control parameters required for the exchange operation of packets communicated on one connection specified by said connection request message.

8. A communication network system according to claim 5, characterized in that:

said communication network system comprises at least one other exchange connected to said switchboard via said connection line; and said master terminal has first call control means for conducting call control between terminals accommodated directly by said switchboard and second call control means for conducting call control between said switchboard and another exchange, and said master terminal selectively actuates said first and second call control means according to header information of a call control message converted from received packets by said communication control means, and performs call control including a status shift of each call and update of control parameters required by said switchboard for a packet exchange operation.

9. A communication network system according to claim 8, characterized in that:

said first call control means comprises a first call control program including an origination analysis process routine to be executed in response to a call establishment request message, a connection process routine to be executed in response to a connection request message, and a disconnection process routine to be executed in response to a disconnection process routine;

said second call control means comprises a second call control program including an origination analysis process routine to be executed in response to a call establishment request message, a termination analysis process routine to be executed in response to a termination request message, a connection process routine to be executed in response to a connection request message, and a disconnection process routine to be executed in response to a disconnection process routine; and if a call control message converted from the received packets by said communication control means is a connection request message, then said master terminal executes said connection process routine of said first or second call control program and notifies said switchboard of control parameters required for the exchange operation of packets communicated on one connection specified by said connection request message.

10. A communication network system according to claim 5, 6, 8 or 9, characterized in that:

said switchboard comprises a line interface provided for each connection line and switch means for outputting packets received from each line interface to some line interface;

said each line interface comprises header conversion means for rewriting header information of each packet received from said input line according to control parameters stored in a conversion table and inputting resulting packets to said switch means, and means for selectively terminating the signalling packets received from said switch means and updating contents of said conversion table according to contents of said signalling packets; and a control message for updating the contents of said conversion table is sent to a line interface on one connection associated with a received call control message by the call control means of said master terminal.

11. A communication network system according to claim 5, 6, 8 or 9, characterized in that said communication control means sends/receives said packets to/from said switchboard in an asynchronous transfer mode (ATM) cell form of fixed length.

12. A communication network system according to claim 5, characterized in that said communication network system comprises a second switchboard connected to said switchboard via said connection line, and said first master terminal conducts call control of said second switchboard as well by using said call control means.

13. A communication network system including a plurality of pairs of connection lines each having an input line and an output line, a switchboard for relaying packets received from an arbitrary input line to some output line determined by header information of the packets, a plurality of terminals connected to said connection lines, and at least one other exchange connected to said switchboard via said connection line, characterized in that:

each of said terminals has communication control means for converting a call control message to be sent to said switchboard and an information message to packets of predetermined formats, sending the packets to said input line, and converting packets received from said output line via said switchboard to messages;

a first master terminal which is one of said plurality of terminals has first call control means for conducting call control between terminals accommodated by said switchboard;

a second master terminal which is one of said plurality of terminals has call control means for conducting call control between said switchboard and said other exchange;

said switchboard has means for selectively relaying packets for signalling received from said each input line to said first or second master terminal; and in response to a call control message converted from the received packets by each communication control means, each of said first and second master terminal actuates said each call control means and performs call control including a status shift of each call and update of control parameters required by said switchboard for a packet exchange operation.

14. A communication network system according to claim 13, characterized in that:

the call control means of said first terminal comprises a first call control program including an origination analysis process routine to be executed in response to a call establishment request message, a connection process routine to be executed in response to a connection request message, and a disconnection process routine to be executed in response to a disconnection process routine;

the call control means of said second master terminal comprises a second call control program including an origination analysis process routine to be executed in response to a call establishment request message, a termination analysis process routine to be executed in response to a termination request message, a connection process routine to be executed in response to a connection request message, and a disconnection process routine to be executed in response to a disconnection process routine; and if a call control message converted from the received packets by said communication control means is a connection request message, then each of said first and second master terminals executes the connection process routine of said first or second call control program and notifies said switchboard of control parameters required for the exchange operation of packets communicated on one connection specified by said connection request message.

15. A communication network system according to claim 13 or 14, characterized in that:

said switchboard comprises a line interface provided for each connection line and switch means for outputting packets received from each line interface to some line interface;

said each line interface comprises header conversion means for rewriting header information of each packet received from said input line according to control parameters stored in a conversion table and inputting the header information to said switch means, and means for selectively terminating the signalling packets received from said switch means and updating contents of said conversion table according to contents of said signalling packets; and a control message for updating the contents of said conversion table is sent to a line interface on one connection associated with a received call control message by the call control means of each of said first and second master terminals.

16. A communication network system according to claims 13 or 14, characterized in that the communication control means of said first master terminal sends/receives said packets to/from said switchboard in an asynchronous transfer mode (ATM) cell form of fixed length having a first format, and the communication control means of said second master terminal sends/receives said packets to/from said switchboard in an asynchronous transfer mode (ATM) cell form of said fixed length having a second format.

17. A packet exchange system including a plurality of pairs of connection lines for connection to a terminals or another exchange, each pair having an input line and an output line, a switchboard for relaying packets received from an arbitrary input line to some output line determined by header information of the packets, and a master terminal connected to said switchboard via one of said connection lines, characterized in that:

said master terminal includes a processor, a call control program for conducting call control of said switchboard, an application program for processing an information message communicated between said master terminal and another terminal, and communication control means for converting a call control message to be sent to said switchboard and an information message to be sent to another terminal to packets of predetermined formats, sending the packets to said input line, and converting packets received from said output line via said switchboard to messages;

said switchboard has means for selectively relaying signalling packets received from said each input line to said master terminal; and said master terminal executes said application program in response to an information message converted from received packets by said communication control means, executes said call control program in response to a call control message converted from received packets by said communication control means, and performs call control including a status shift of each call and update of control parameters required by said switchboard for a packet exchange operation.

18. A packet exchange system according to claim 17, characterized in that said master terminal has a call control function in user-network interface and/or a call control function in network-network interface.

19. A packet exchange system according to claim 17 or 18, characterized in that said communication control means sends/receives said packets in an asynchronous transfer mode cell form of fixed length.

* * * * *